(12) United States Patent
Nakashima et al.

(10) Patent No.: US 8,086,113 B2
(45) Date of Patent: Dec. 27, 2011

(54) OPTICAL RECEIVER

(75) Inventors: Hisao Nakashima, Kawasaki (JP);
Takeshi Hoshida, Kawasaki (JP);
Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 798 days.

(21) Appl. No.: 12/104,056

(22) Filed: Apr. 16, 2008

(65) Prior Publication Data

US 2008/0267638 A1    Oct. 30, 2008

(30) Foreign Application Priority Data

Apr. 27, 2007  (JP) ................... 2007-120059

(51) Int. Cl.
*H04B 10/00* (2006.01)
(52) U.S. Cl. .................... 398/206; 398/205; 398/209
(58) Field of Classification Search ........... 398/202–214
See application file for complete search history.

(56) References Cited

U.S. PATENT DOCUMENTS

| | | | | |
|---|---|---|---|---|
| 4,718,121 A * | 1/1988 | Epworth | ............... | 398/203 |
| 4,829,598 A * | 5/1989 | Auracher et al. | ............ | 398/204 |
| 5,422,752 A * | 6/1995 | Hardcastle | ............ | 398/187 |
| 5,459,599 A * | 10/1995 | Van Deventer | .......... | 398/136 |
| 6,917,031 B1 * | 7/2005 | Sun et al. | ............ | 250/214 R |
| 7,042,629 B2 * | 5/2006 | Doerr et al. | ............ | 359/325 |
| 7,076,169 B2 * | 7/2006 | Shpantzer et al. | ........ | 398/76 |
| 7,085,501 B1 * | 8/2006 | Rickard et al. | ........... | 398/202 |
| 7,133,135 B2 * | 11/2006 | Dorrer | ............... | 356/450 |
| 7,298,489 B2 * | 11/2007 | Dorrer | ............... | 356/450 |
| 7,406,269 B2 * | 7/2008 | Becker et al. | ............ | 398/206 |
| 7,747,177 B2 * | 6/2010 | Chen et al. | ............. | 398/206 |
| 7,809,284 B2 * | 10/2010 | Kaneda et al. | ............ | 398/204 |
| 2005/0185255 A1 | 8/2005 | Doerr et al. | | |
| 2007/0036555 A1 | 2/2007 | Chen et al. | | |
| 2007/0147850 A1 * | 6/2007 | Savory et al. | ........... | 398/208 |
| 2007/0206963 A1 * | 9/2007 | Koc | ............... | 398/202 |
| 2008/0267638 A1 * | 10/2008 | Nakashima et al. | ....... | 398/208 |
| 2009/0074428 A1 * | 3/2009 | Liu | ............... | 398/208 |
| 2009/0190929 A1 * | 7/2009 | Khurgin et al. | ........... | 398/79 |

FOREIGN PATENT DOCUMENTS

EP    0 275 920    7/1988

(Continued)

OTHER PUBLICATIONS

European Search Report issued Dec. 17, 2009 for corresponding European Patent Application No. 09 173 266.9-2415.

(Continued)

*Primary Examiner* — Agustin Bello
(74) *Attorney, Agent, or Firm* — Staas & Halsey LLP

(57) ABSTRACT

An optical mixing part mixing a received optical signal and local oscillator light in at least two kinds of phases and extracting at least two-system optical signals corresponding to each light phase; a photoelectric conversion part converting the at least two-system optical signals obtained in the optical mixing part into electric analog signals; an analog-to-digital conversion part converting the electric analog signals into digital signals; and a control part processing the digital signals thereby detecting a light phase difference between the respective systems in the optical mixing part and supplying a signal for correcting the light phase between the systems to the optical mixing part to control the optical mixing part so that the light phase difference becomes to zero or close to a desired value when the light phase difference has a shift from the desired value.

18 Claims, 20 Drawing Sheets

FOREIGN PATENT DOCUMENTS

EP 0 527 503 2/1993

OTHER PUBLICATIONS

S. Tsukamoto, et al. "Optical Homodyne Receiver Comprising Phase and Polarization Diversities with Digital Signal Processing", ECOC2006, Jul. 23-25, 2007.

M. Seimetz, et al., "Options, Feasibility, and Availability of 2 +4 90° Hybrids for Coherent Optical Systems", Journal of Lighwave Technology, vol. 24, No. 3, Mar. 2006, pp. 1317-1322.

F. Harris, "Digital Fiber Equalization of Analog Gain and Phase Mismatch in I-Q Receivers", 1996 5$^{th}$ IEEE International Conference; Digital Filter Equalization of Analog, Sep. 29-Oct. 2, 1996, pp. 793-796.

European Search Report issued Mar. 4, 2009 for corresponding European Patent Application No. 08007926.2-2415.

Partial European Search Report issued Sep. 15, 2008 in corresponding European Patent Application No. 08007926.2.

Leonid G. Kazovsky, et al., "Homodyne Phase-Shift-Keying Systems: Past Challenges and Future Opportunities", Journal of Lightwave Technology, vol. 24, No. 12, Dec. 1, 2006, pp. 4876-4884.

European Search Report dated Dec. 29, 2009 for corresponding European Patent Application No. 09173265.1.

\* cited by examiner

OPTICAL RECEIVER

TECHNICAL FIELD

The present invention relates to an optical receiver.

DESCRIPTION OF THE RELATED ART

Demand for achievement of a transmission capacity of 40 Gbit/sec or more in a backbone communication system has increased with the advance of popularization of the Internet in recent years. Various modulation format excellent in frequency utilization efficiency, optical-signal-to-noise ratio (OSNR) tolerance and nonlinear tolerance have been grouped so as to be used for satisfying this demand in place of an NRZ (Non Return to Zero) modulation format heretofore used in an optical communication system having a transmission capacity of 10 Gbit/sec or less. Among them, an RZ-DQPSK (Return to Zero-Differential Quadrature Phase-Shift Keying) modulation format is a major candidate for a modulation format having dispersion tolerance, PMD tolerance and filtering tolerance.

A receiving method using coherent reception and digital signal processing (DSP) in combination has been noticed as a technique for improving optical-signal-to-noise ratio (OSNR) tolerance and wavelength dispersion tolerance in the RZ-DQPSK modulation format in recent years.

A technique for correcting a phase shift in a 90° hybrid circuit has been disclosed in Patent Document 1 where phase shift means difference from 90° phase of 90° hybrid circuit. A configuration of the 90° hybrid circuit and a receiver using coherent reception and digital signal processing (DSP) in combination have been described in Non-Patent Documents 1 and 2.

[Patent Document 1] U.S. Pat. No. 6,917,031

[Non-Patent Document 1] S. Tsukamoto et al, "Optical Homodyne Receiver Comprising Phase and Polarization Diversities with Digital Signal Processing", ECOC, 2006, MO-4,2,1

[Non-Patent Document 2] M. Seimetz et al, "Options, Feasibility, and Availability of 2×4 90° Hybrids for Coherent Optical Systems", Journal of Lightwave Technology, Vol. 24, No. 3, March 2006, pp. 1317-1322

SUMMARY

FIGS. 19A and 19B are views for explaining the basic configuration of a receiver using coherent reception and digital signal processing (DSP) in combination and a problem therein.

As shown in FIG. 19A, signal light Es having orthogonal polarized wave components Ex and By and local oscillated light (local oscillator light) ELo are inputted to a 90° hybrid circuit 10 for mixing the received optical signal with the local oscillated light per se and with the local oscillated light 90° phase-shifted from the received optical signal, respectively, and extracting components of real part and imaginary part of the optical signal, so that a real component Ex_Re of Ex, an imaginary component Ex_Im of Ex, a real component Ey_Re of By and an imaginary component Ey_Im of Ey are extracted. The respective components are converted into electric signals by Twin-PDs 11-1 to 11-4. The electric signals are amplified by AMPs (amplifiers) 12-1 to 12-4 and then converted into digital signals by ADCs (analog-to-digital converters) 13-1 to 13-4, respectively. The digital signals are processed by a DSP 14.

The signal received by the receiver using coherent reception and DSP in combination cannot be demodulated accurately in the DSP when the phase of the 90° hybrid circuit is 90° shifted or when the respective AMPs have different gains. As a result, phase error occurs so that signal quality deteriorates. FIG. 19B shows deterioration of signal quality against phase error in the case where a four-value phase modulation format is used. As shown in FIG. 19B, it has been found that the degree of deterioration of signal quality (Q penalty) increases in proportion to phase error as the phase error increases.

The output signals (Ex_Re, Ex_Im, Ey_Re and Ey_Im) of a polarization diversity 90° hybrid circuit in the case where a phase modulation format is used are expressed as follows:

$$Ex\_Re \propto |Ex||ELO|\cos(\Delta\omega t + \theta(t))$$

$$Ex\_Im \propto |Ex||ELO|\sin(\Delta\omega t + \theta(t)) \times \cos(\theta h) + |Ex||ELO|\cos(\Delta\omega t + \theta(t)) \times \sin(\theta h)$$

$$Ey\_Re \propto |Ey||ELO|\cos(\Delta\omega t + \theta(t) + \theta p)$$

$$Ey\_Im \propto |Ey||ELO|\sin(\Delta\omega + \theta(t) + \theta p) \times \cos(\theta h) + |Ey||ELO|\cos((\Delta\omega t + \theta(t) + \theta p)x)\sin(\theta h)$$

in which:

Ex is the amplitude of x polarized wave of the signal light;
Ey is the amplitude of y polarized wave of the signal light;
ELO is the amplitude of the local oscillated light;
θh is the phase error of the 90° hybrid circuit;
θp is the phase difference between Ex and Ey (to be compensated by a phase error cancel circuit)*1; and
Δω is the frequency difference between the signal light and the local oscillated light (to be compensated by the phase error cancel circuit)*1.

*1: S. Tukamoto et al, ECOC2006, Mo.4.2.1

If Δω is 0, using Ex_Re, Ex_Im, Ey_Re and Ey_Im, the received signal can be demodulated as follows:

$$Es = (Ex\_Re + jEx\_Im) + (Ey\_Re + jEy\_Im)$$

$$\theta s = \arg(Es)$$

In the case of θh≠0, phase error occurs because the imaginary part components of the received signal cannot be received correctly.

Patent Document 1 is a commonly known technique for compensating the phase error of the 90° hybrid circuit. In such feed-forward control as shown in Patent Document 1, accuracy in detection of a control signal however must be high not only when the control signal is near a target value but also when the control signal is far from the target value, because the detected control signal is directly used for the feed-forward control.

FIG. 20 is a graph showing the phase error of the 90° hybrid circuit and the difference between the actual phase error and the estimate.

The graph of FIG. 20 is a graph showing control error in the case where feed-forward control is used in consideration of quantization error of the ADCs. As shown in this graph, it has been found that when the number of quantization bits is limited, control error increases in the case where the phase of the 90° hybrid circuit is shifted largely.

Accordingly, even the configuration of Patent Document 1 is insufficient as means for correcting the phase error sufficiently.

Moreover, the input signal power (AMP gain) of each ADC which varies in accordance with a variation of received light power, etc. needs to be controlled optimally in order to minimize the quantization error based on the ADCs.

The demodulated signal in consideration of the gains of the AMPs is expressed as follows:

$$Es=(Ex\_Re*G+jEx\_Im*G)+(Ey\_Re*G+jEy\_Im*G)$$

$$\theta s=\arg(Es)$$

Because Es cannot be demodulated accurately when the gains of the respective AMPs are different from one another, the gains of the respective AMPs must be equal to one another at the time of gain control of the AMPs.

Particularly a receiver having a polarization diversity configuration needs controlling for optimizing the input signal light power of the ADCs and equalizing the AMP gains of Ex and Ey because the signal power of Ex and Ey varies temporally in accordance with a polarized wave variation generated in a transmission path.

When four symbols appear in the same probabilities in the case where the four-value phase modulation format is used, the signal power of the real part and the signal power of the imaginary part are made equal to each other so that the gains of the AMPs are made nearly equal to one another even when the AMPs are controlled individually. Accordingly, this function has a large effect in the receiver having the polarization diversity.

SUMMARY

According to an aspect of an embodiment, an optical receiver uses coherent reception and digital signal processing in combination, and has excellent in receiving accuracy.

According to an aspect of an embodiment, an optical receiver includes: an optical mixing part mixing a received optical signal and local oscillated light in at least two kinds of phases and extracts at least two-system optical signals corresponding to each light phase; a photoelectric conversion part converting the at least two-system optical signals obtained in the optical mixing part into electric analog signals; an analog-to-digital conversion part converting the electric analog signals obtained by the photoelectric conversion part into digital signals; and a control part processing the digital signals obtained by the analog-to-digital conversion part thereby detecting a light phase difference between the respective systems in the optical mixing part and supplying a signal for correcting the light phase between the systems to the optical mixing part to control the optical mixing part so that the light phase difference becomes to zero or close to a desired value when the light phase difference has a shift from the desired value.

The above aspects of embodiments are only intended as examples. All aspects of all embodiments are not limited to including all the features described above.

DETAILED DESCRIPTION OF THE PREFERRED EMBODIMENTS

Figure 1:
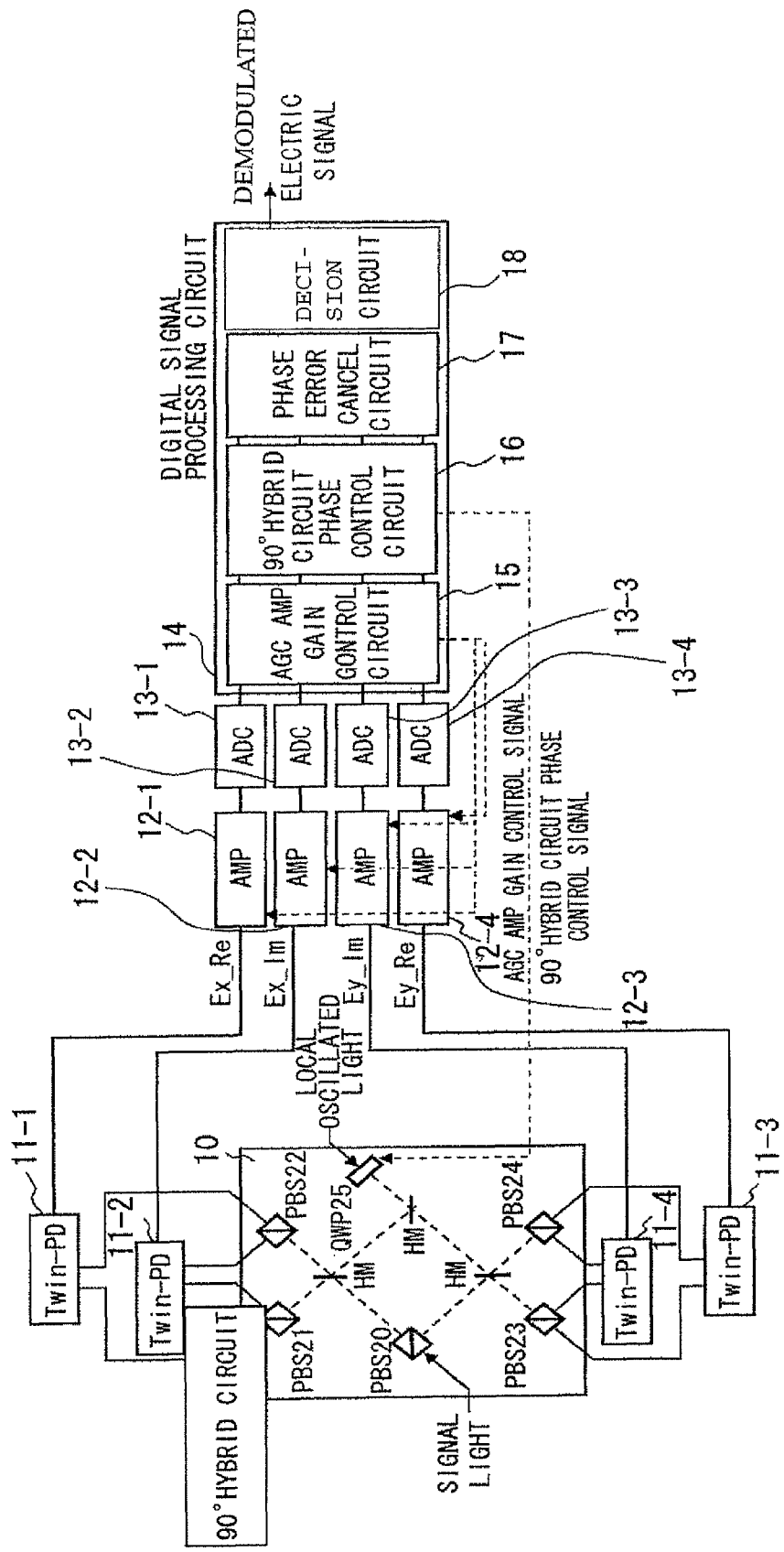
FIG. 1 is a diagram showing the overall configuration of an optical receiver according to an embodiment of the invention.

FIG. 1 is a diagram showing the overall configuration of an optical receiver according to an embodiment of the invention. Incidentally, the following embodiment will be described while instancing a 90° hybrid circuit for mixing between two optical phases of 0° and 90° and optical signal in an optical mixer and extracting two-system signals corresponding to the optical phases of 0° and 90°. However, when an optical mixer for mixing optical phases of 0°, 120° and 240° is used, the same effect as described above can be obtained by use of a DSP (digital signal processor) for extracting signals corresponding to 0 and 90° from the obtained three-system signals.

To compensate for deterioration of signal quality caused by the phase shift of the 90° hybrid circuit 10, a phase shift signal of the 90° hybrid circuit 10 is detected to thereby perform feedback control of the phase of the 90° hybrid circuit. To compensate for deterioration of signal quality caused by gain shifts of AMPs 12-1 to 12-4, light intensity is calculated from four electric signals outputted from the 90° hybrid circuit to thereby perform feedback control of the gains of the respective AMPs so that the calculated light intensity becomes equal to a target value.

Figure 19:
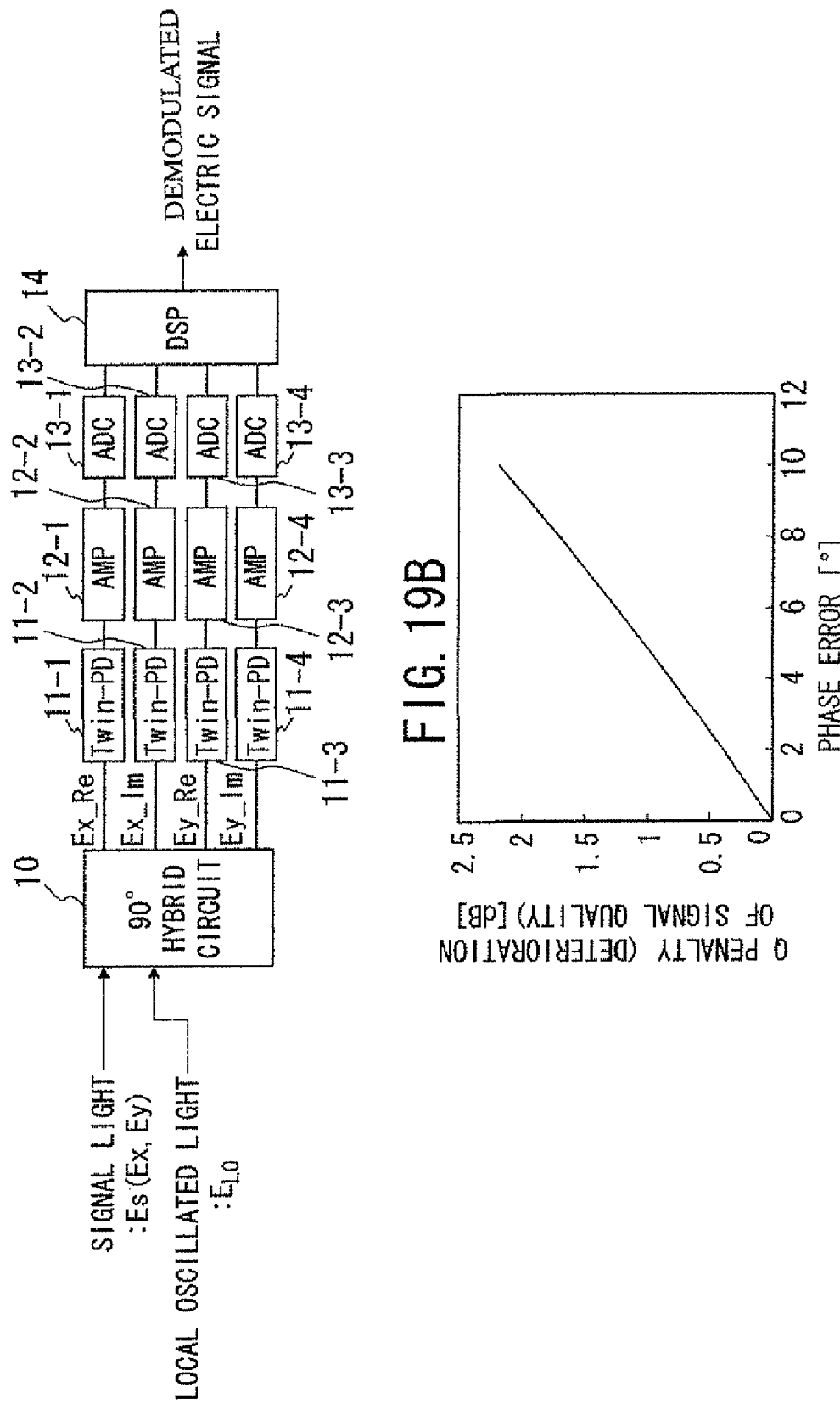
FIGS. 19A and 19B are views for explaining the basic configuration of a receiver using coherent reception and DSP in combination and a problem in the receiver.

In FIG. 1, the same configuration as in FIG. 19A is referred to by the same reference number. Inside a DSP circuit 14, an AMP gain control circuit 15 is provided for detecting digitized AMP outputs and controlling the gains of the AMPs by feedback control. The AMPs 12-1 to 12-4 are controlled so that all have the same gain. Also in the DSP circuit 14, a 90° hybrid circuit phase control circuit 16 is provided for detecting Ex_Re, Ex_Im, Ey_Re and Ey_Im as digital signals, generating a phase control signal for the 90° hybrid circuit 10 and correcting the phase error of the 90° hybrid circuit 10. A phase error cancel circuit 17 is a circuit in which phase error due to unsynchronized phase between signal and local oscillated laser. A decision circuit 18 is a circuit for discriminating between signal phases.

An example of the internal configuration of the 90° hybrid circuit 10 shown in FIG. 1 will be described.

Inputted signal light is split into orthogonal polarized waves by a polarization beam splitter (PBS) 20. On the other hand, local oscillated light is converted into circularly polarized wave by a quarter-wave plate 25. The circularly polarized wave is made to branch into two by a half-silvered mirror. The respective polarized waves of the signal light and the respective circularly polarized waves of the converted local oscillated light are mixed by half-silvered mirrors, split into polarized waves by polarization beam splitters 21, 22, 23 and 24 and received by Twin-PDs 11-1 to 11-4 respectively. The optical component detected by the Twin-PD 11-1 is Ex-Re, the optical component detected by the Twin-PD 11-2 is Ex_Im, the optical component detected by the Twin-PD 11-3 is Ey_Re, and the optical component detected by the Twin-PD 11-4 is Ey_Im.

Figure 2:
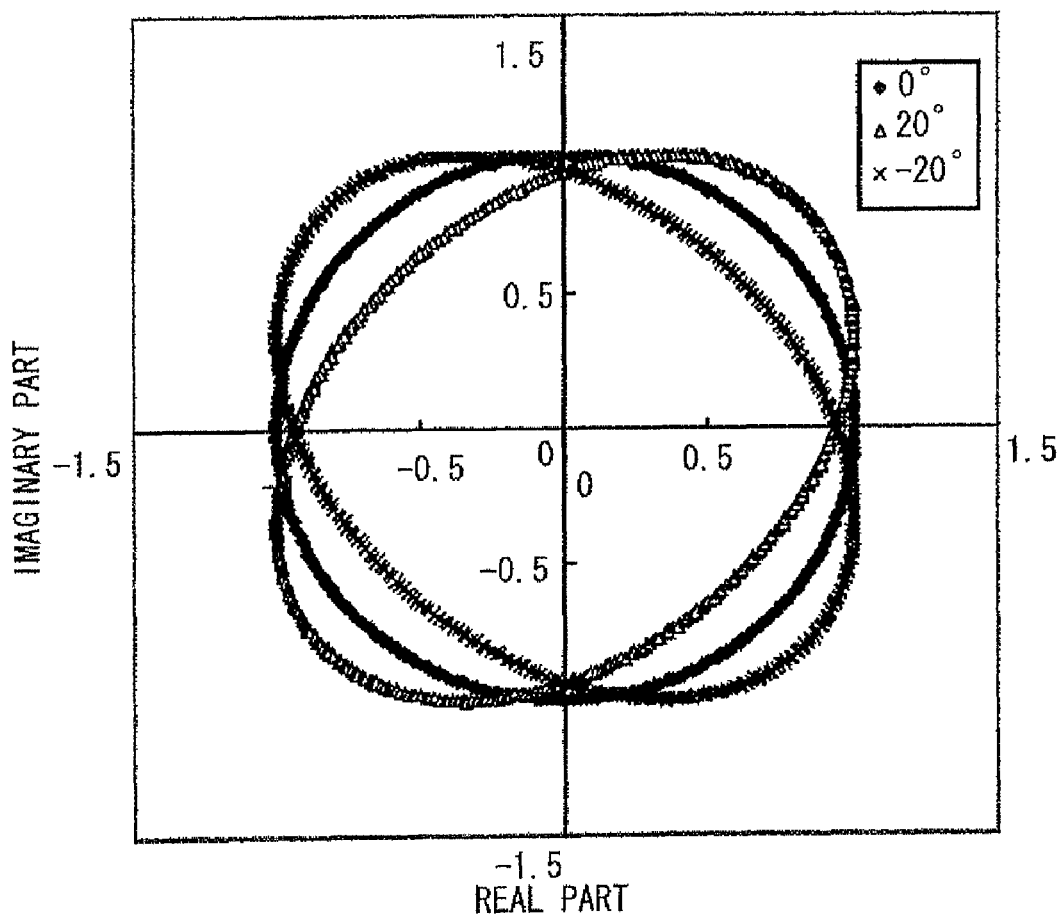
FIG. 2 is a (first) view for explaining a phase control method for a 90° hybrid circuit.
Figure 3B:
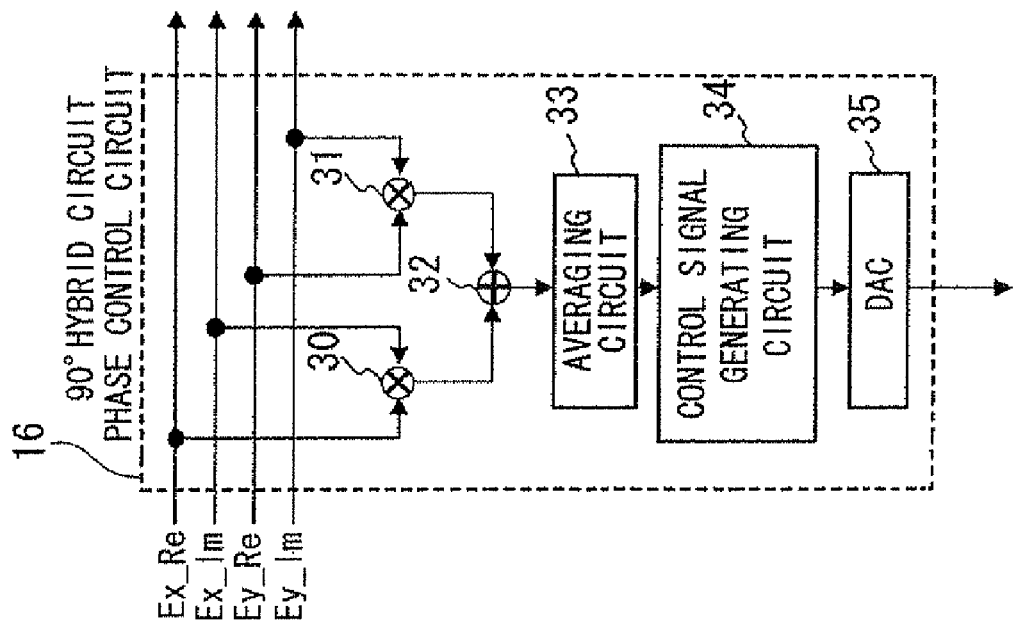
FIGS. 3A and 3B are (second) views for explaining the phase control method for the 90° hybrid circuit.
Figure 3A:
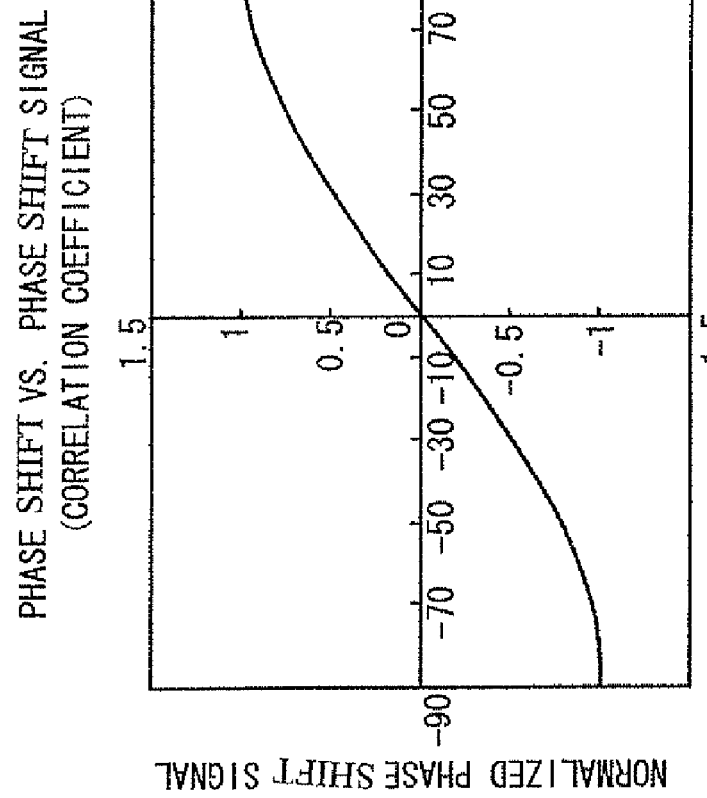

FIGS. 2, 3A and 3B are views for explaining a method for controlling the phase of the 90° hybrid circuit.

FIG. 2 shows a constellation of received signals in the cases where phase shifts of the 90° hybrid circuit are 0°, 20° and −20°. When there is a phase shift, a correlation between real part and imaginary part appears. When the phase shift is plus, the correlation between real part and imaginary part becomes plus. When the phase shift is minus, the correlation between real part and imaginary part becomes minus. When there is no phase shift, the correlation between real part and imaginary part becomes zero. Accordingly, the phase of the 90° hybrid circuit is feedback-controlled so that a correlation coefficient of zero can be obtained.

The correlation coefficient r is expressed as follows:

$$r = \sum \{Ex\_Re * Ex\_Im + Ey\_Re * Ey\_Im\}$$
$$= \sum \{|Ex||ELO|/2(\sin(2\theta x)\cos(\theta h) + \cos(2\theta x)\sin(\theta h) +$$
$$\sin(\theta h)) + |Ey||ELO|/2(\sin(2\theta y)\cos(\theta h) + \cos(2\theta y)\sin(\theta h) +$$
$$\sin(\theta h))\}$$
$$= \sum \{(|Ex| + |Ey|) * |ELO|/2 * \sin(\theta h)\} +$$
$$\sum \{|Ex||ELO|/2(\sin(2\theta x)\cos(\theta h) + \cos(2\theta x)\sin(\theta h)) +$$
$$|Ey||ELO|/2(\sin(2\theta y)\cos(\theta h) + \cos(2\theta y)\sin(\theta h))\}$$

$$\theta x = \Delta \omega t + \theta(t), \theta y = \Delta \omega t + \theta(t) + \theta p$$

When probabilities of occurrence of respective symbols ($\theta(t)$) are equal, the second term of the correlation coefficient becomes zero and the correlation coefficient r is expressed as follows.

$$r = \Sigma\{(|Ex|*|ELO| + |Ey|*|ELO|)/2*\sin(\theta h)\}$$

Accordingly, to make r zero is to make $\sin(\theta h)$ zero. This is to make $\theta h$ zero, that is, to make the phase error of the 90° hybrid circuit zero.

FIG. 3A shows the aforementioned equation of r as a graph which shows the magnitude of a normalized phase error signal versus the phase shift of the 90° hybrid circuit. Here, since the phase error signal has a value proportional to the correlation coefficient r, the magnitude of the normalized phase error signal also expresses the normalized correlation coefficient.

FIG. 3B shows an example of configuration of the 90° hybrid circuit phase control circuit.

To calculate the aforementioned correlation coefficient, Ex_Re and Ex_Im are multiplied together by a multiplier 30, Ey_Re and Ey_Im are multiplied together by a multiplier 31, and these products are added by an adder 32. The obtained correlation coefficient values corresponding to symbols are averaged by an averaging circuit 33, and a 90° hybrid circuit phase control signal proportional to the average correlation coefficient is generated by a control signal generating circuit 34. The generated phase control signal which is a digital signal is converted into an analog signal by a digital-to-analog converter 35, so that the analog signal is supplied to the 90° hybrid circuit. The phase control signal has a value proportional to the average correlation coefficient. The coefficient of proportionality can be decided by those skilled in the art.

Figure 4:
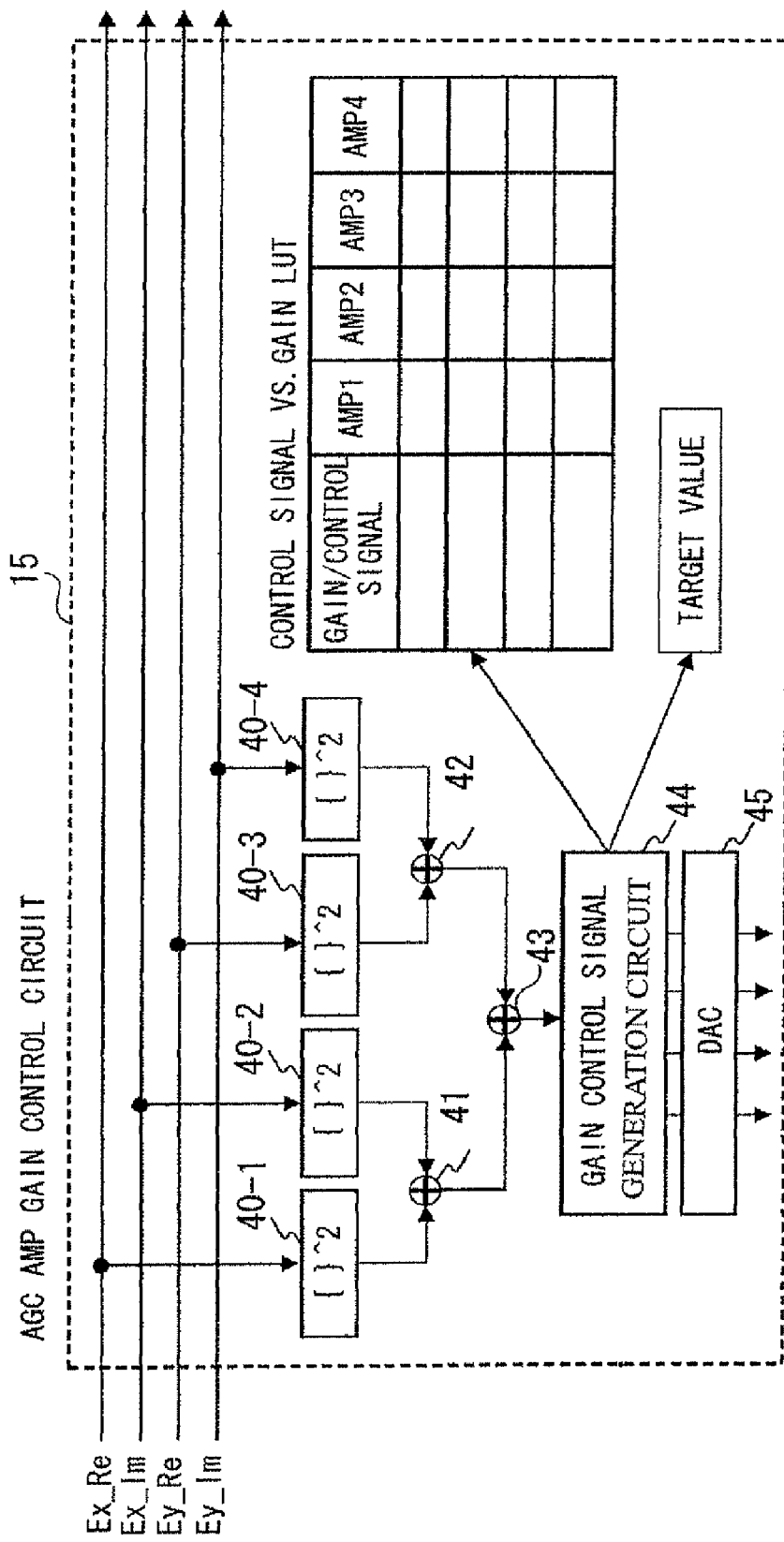
FIG. 4 is a (first) view for explaining a gain control method for AMPs.
Figure 5:
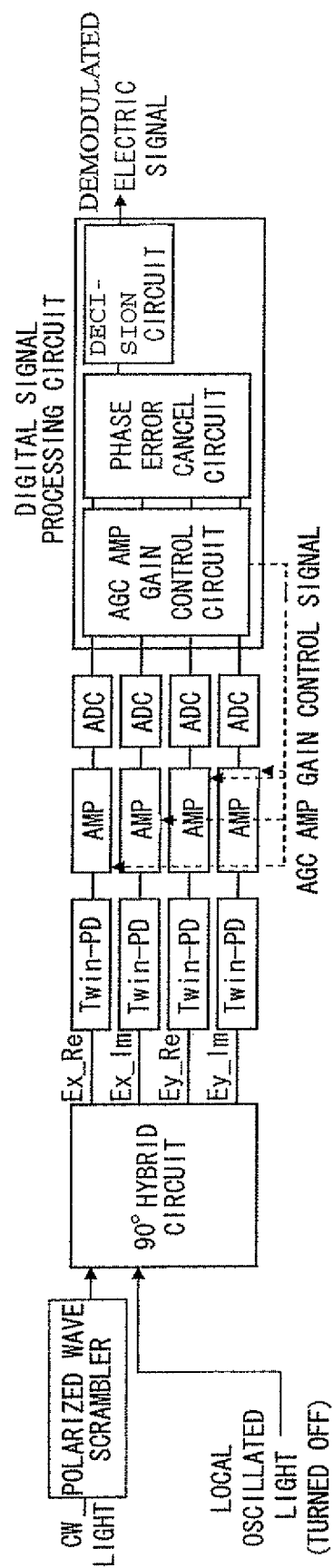
FIG. 5 is a (second) view for explaining the gain control method for the AMPs.

FIGS. 4 and 5 are views for explaining a method for controlling gains of the AMPs.

Input signal light power is calculated from four ADC output signals. Four AGC amplifiers are set to have the same gain so that the calculated value becomes equal to a target value. The expression for calculating the input signal light power from the ADC output signals is given by the following expression.

$$(Ex\_Re^2 + Ex\_Im^2) + (Ey\_Re^2 + Ey\_Im^2)$$

The target value is a value which is set so that the dynamic range of each ADC can be used effectively. That is, target value is made so that the maximum power of signal light becomes equal to the highest value of the dynamic range of the ADC. For example, the optimum gain is determined from the relation between received light power and the maximum amplitude of an electric signal in consideration of degradation of waveform due to dispersion or DGD (Differential Group Delay) so that the upper limit of the electric signal is not cut by each AMP. When the characteristic of gain control signal versus AMP gain of each AMP varies, the AMP gain is controlled with reference to a table of control signal versus gain in accordance with each AMP.

FIG. 4 is a view showing an example of configuration of the AMP gain control circuit.

To execute the aforementioned calculation of the input signal light power, respective squares of Ex_Re, Ex_Im, Ey_Re and Ey_Im obtained from the ADCs are calculated by squarers 40-1 to 40-4. These squares are added by adders 41, 42 and 43, so that the obtained value is inputted to a gain control signal decision circuit 44. The gain control signal generation circuit 44 compares the inputted value with the target value and generates gain control signals for changing the gains of the four AMPs so that each ADC output value becomes equal to the target value. The gain control signals are converted into analog signals by a DAC 45, so that the analog signals are supplied to the AMPs respectively. The gains of the four AMPs are set at the same value. Accordingly, the gain control signals equalize the gains of the four AMPs to one another and change the gains of the four AMPs equally so that the output value of each ADC becomes close to the target value.

Alternatively, an LUT (look-up table) indicating values of signals to be used as control signals for obtaining predetermined gains in accordance with the AMPs may be provided in the gain control signal generation circuit 44 in advance so that the gain control signal generation circuit 44 can generate values of gain control signals given to the AMPs respectively by referring to the LUT.

FIG. 5 is a diagram for explaining a method for making a table of control signal vs. gain.

Before shipment, the table of control signal vs. gain is made based on the following adjustment. First, in the condition that local oscillated light in a coherent receiver is turned off, CW light which is polarization-scrambled is inputted to thereby equalize signal light power of Ex_Re, Ex_Im, Ey_Re and Ey_Im. Then, a gain control signal is changed and four amounts of signal power versus gain control signal are measured to thereby generate the LUT of gain control signal vs. gain in accordance with each signal.

Figure 6:
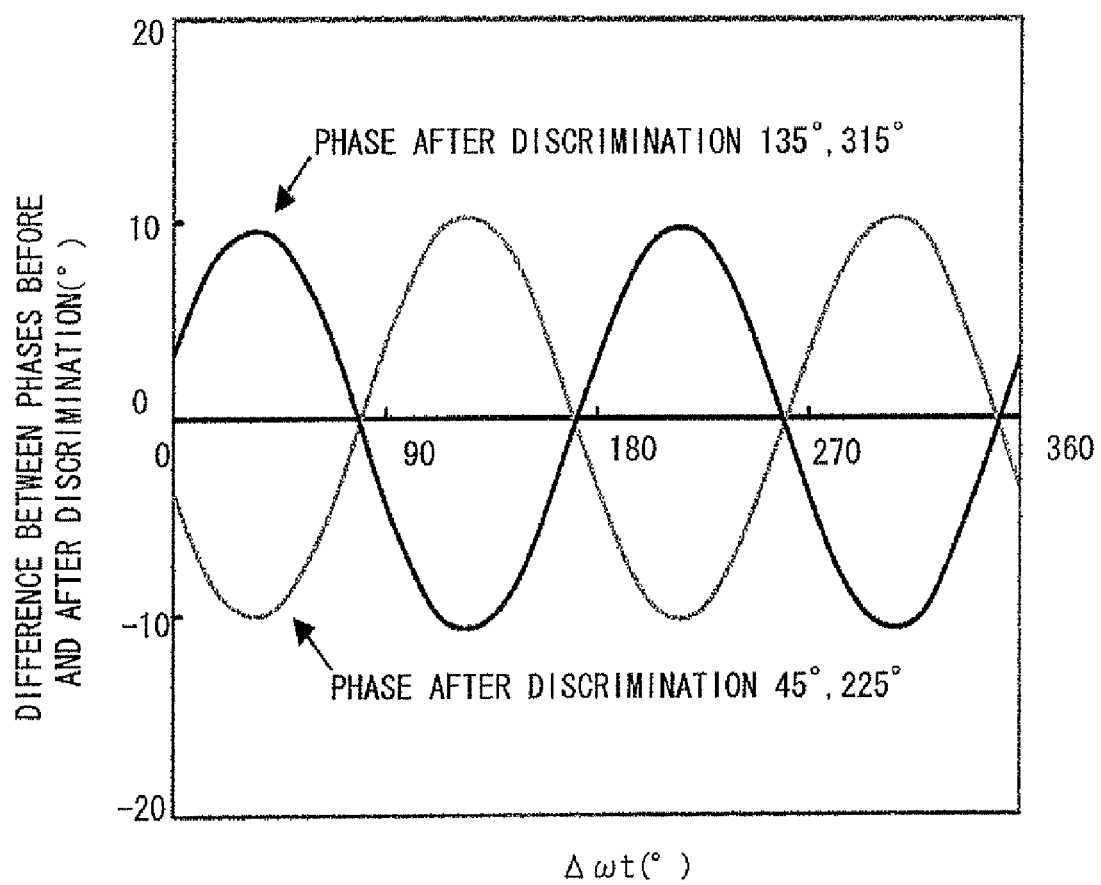
FIG. 6 is a (first) view for explaining a second example of the phase control method for the 90° hybrid circuit.
Figure 7B:
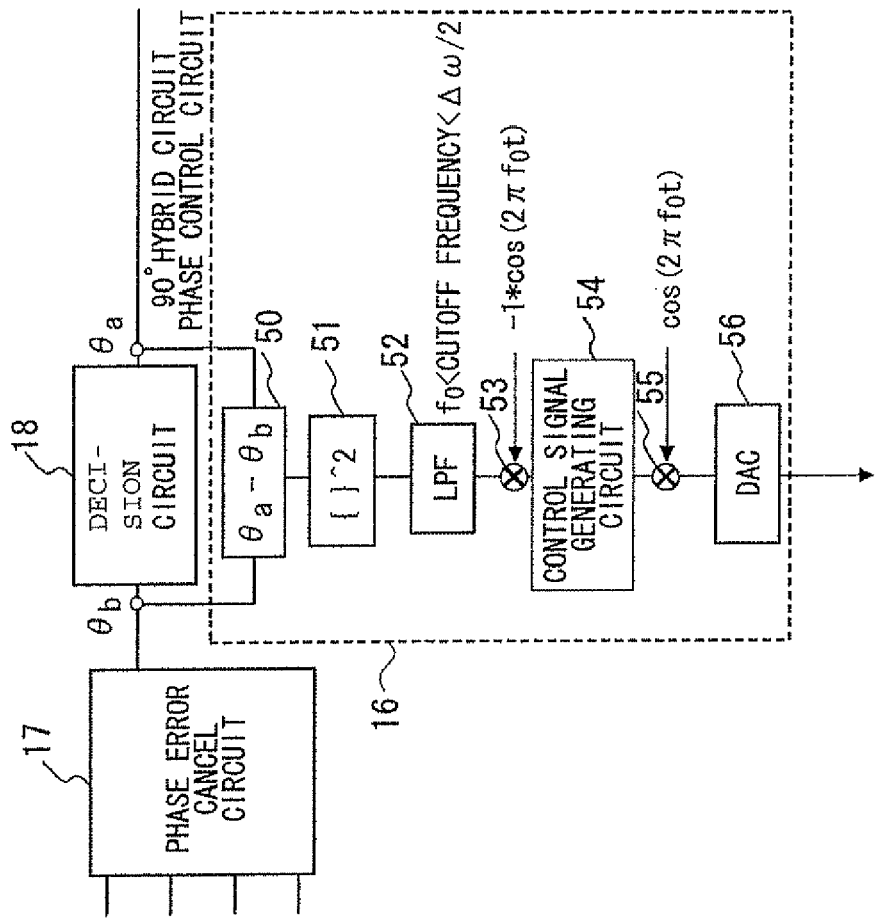
FIGS. 7A and 7B are (second) views for explaining the second example of the phase control method for the 90° hybrid circuit.
Figure 7A:
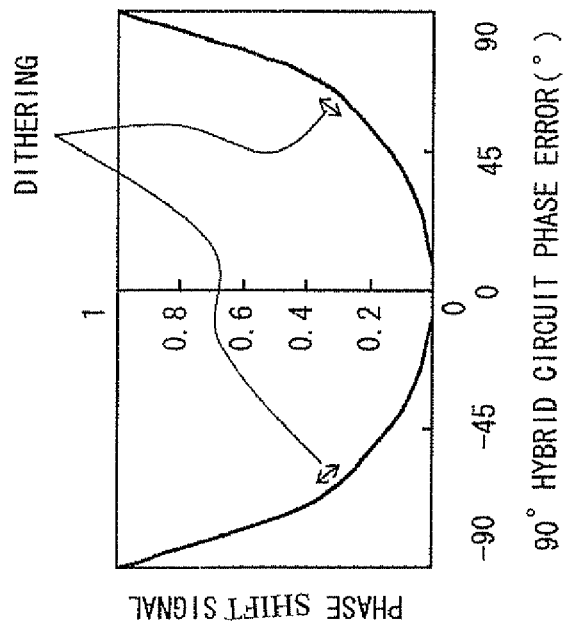

FIGS. 6, 7A and 7B are views for explaining a second example of the 90° hybrid circuit phase control method.

In this case, a phase difference between phases before and after decision in each of real part and imaginary part of each digitized polarized wave is used as a phase error signal. FIG. 6 shows a temporal change of the phase difference between phases before and after decision in the case where there is some phase shift in the 90° hybrid circuit. When there is some phase shift, error occurs in the phase to be compensated by the phase error cancel circuit since the phase of the received signal on a complex plane is not on a concentric circle (see FIG. 2). As a result, phase error fluctuates in a period of $\Delta\omega/2$ where $\Delta\omega$ is frequency difference between signal and local oscillated laser. In this method, the variation of phase error is used as a phase error signal.

FIG. 7A is a diagram showing an example of configuration of the 90° hybrid circuit phase control circuit.

A difference between a phase $\theta b$ which is an output of the phase error cancel circuit 17 and which is before decision in the decision circuit 18, and a phase $\theta a$ after decision is computed by a subtracter 50. A square of the difference is computed by a squarer 51 and passed through a low-pass filter 52. A multiplier 53 is a circuit for synchronously detecting a signal superposed on a control signal to thereby detect the phase of the superposed signal. The multiplier 53 detects the sign of the phase error by multiplying $-1*\cos(2\pi f_0 t)$.

FIG. 7B is a graph showing the relation between the 90° hybrid circuit phase shift and the value of the phase error signal. Since whether the 90° hybrid circuit phase shift is on a plus side or on a minus side can be discriminated by synchronous detection, a signed error signal is inputted to a control signal generating circuit 54. Here, the frequency of dithering is $f_0$. A control signal generated based on the detected signal is outputted from the control signal generating circuit 54. A multiplier 55 multiplies the control signal by a signal of $\cos(2\pi f_0 t)$ for performing dithering. The resulting signal is converted into an analog signal by a DAC 56, so that the analog signal is provided as a phase control signal for the 90° hybrid circuit. Since dithering is applied to the phase control signal given to the 90° hybrid circuit, the phase of the 90° hybrid circuit vibrates in the vicinity of a value set by the phase control signal. When the phase error signal is viewed after passage through the phase error cancel circuit 17, the subtracter 50, the squarer 51 and the low-pass filter 52, the phase error signal still vibrates at the frequency $f_0$ in the vicinity of a predetermined value because of dithering. This signal and $-1*\cos(2\pi f_0 t)$ are multiplied by the multiplier 53 to thereby cancel the vibration and obtain a direct-current (DC) value having a sign corresponding to the plus or minus of the 90° hybrid circuit phase error, so that the DC value is received by the control signal generating circuit 54. Incidentally, assume that the cutoff frequency of the low-pass filter 52 satisfies the relation $f_0 <$ cutoff frequency $< \Delta w/2$.

Figure 8:
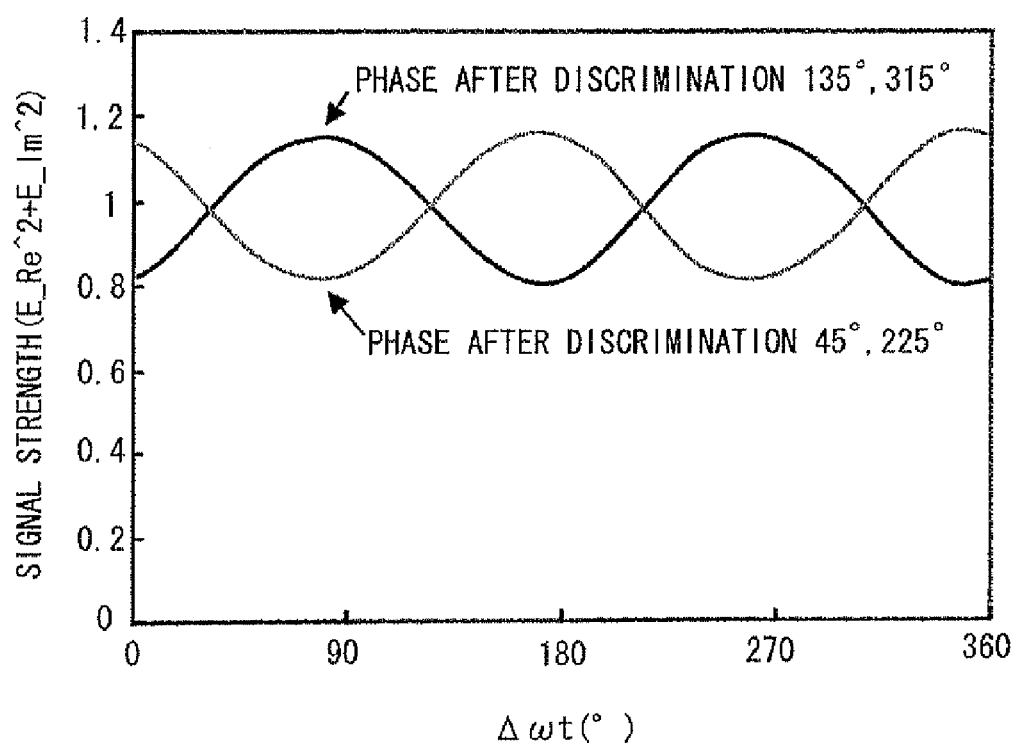
FIG. 8 is a (first) view for explaining a third example of the phase control method for the 90° hybrid circuit.
Figure 9B:
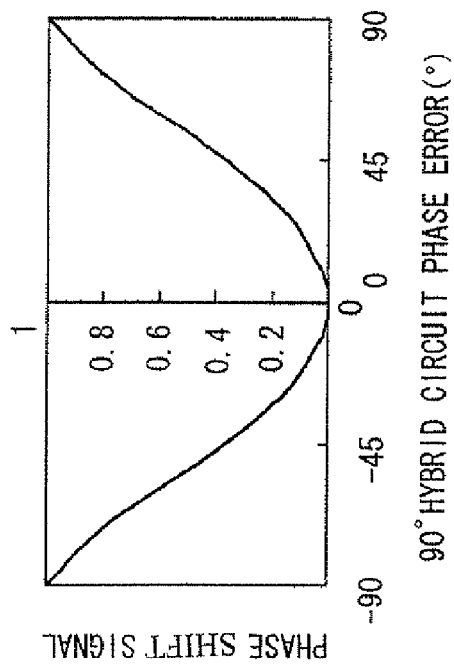
FIGS. 9A and 9B are (second) views for explaining the third example of the phase control method for the 90° hybrid circuit.
Figure 9A:
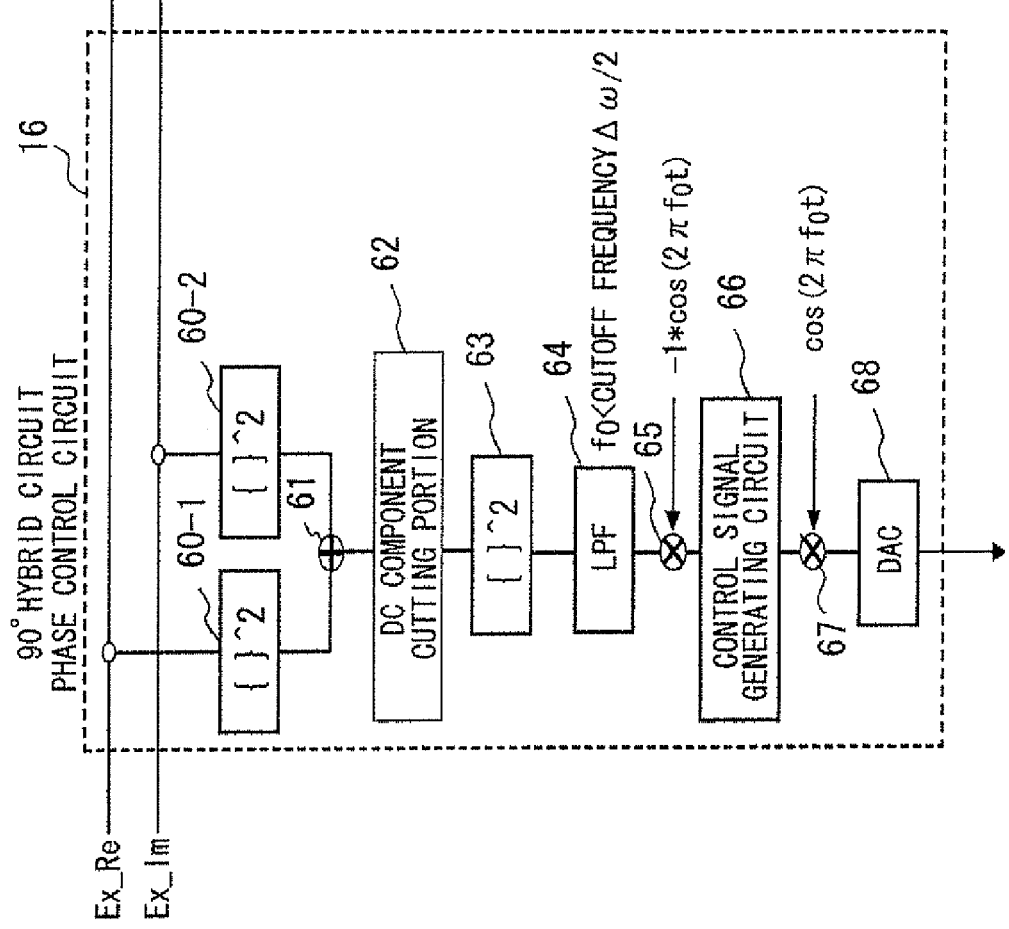

FIGS. 8, 9A and 9B are views for explaining a third example of the 90° hybrid circuit phase control method.

This method is a method using received signal strength as a phase error signal. FIG. 8 shows a temporal change of signal strength in the case where there is some phase error in the 90° hybrid circuit. When there is some phase error, a change of strength occurs because the phase of the received signal is not on a concentric circle (see FIG. 2). As a result, signal strength fluctuates in a period of $\Delta\omega/2$ where $\Delta\omega$ is frequency difference between signal and local oscillated laser. In this method, the variation of strength is used as a phase error signal.

FIG. 9B is a graph showing the relation between the 90° hybrid circuit phase error and the phase error signal. This graph is like FIG. 7B. It is found that applying dithering to the phase error signal is effective in detecting whether the 90° hybrid circuit phase error is plus or minus. FIG. 9A shows an example of configuration of the 90° hybrid circuit phase control circuit. Only description about Ex_Re and Ex_Im is shown here. A square of Ex_Re and a square of Ex_Im are computed by squarers 60-1 and 60-2, respectively. The resulting signals are added by an adder 61. A DC component is cut from the resulting signal by a DC cutting part 62. A square of the resulting signal is computed by a squarer 63. A high-frequency component is removed from the resulting signal by a low-pass filter 64 having a cutoff frequency satisfying the relation $f_0 <$ cutoff frequency $< \Delta\omega)/2$. To remove vibration caused by dithering, the resulting signal is multiplied by $-1*\cos(2\pi f_0 t)$ by a multiplier 65, so that a result of the multiplication is inputted into a control signal generating circuit 66. The control signal generating circuit 66 generates a control signal and outputs it. The outputted control signal is multiplied by dithering of $\cos(2\pi f_0 t)$ by a multiplier 67. The resulting signal is converted into an analog signal by a DAC 68, so that the analog signal is inputted to the 90° hybrid circuit.

Alternatively, AMP gain control can be performed as follows.

That is, photocurrents IX_Re, IX_Im, IY_Re and IY_Im flowing in four Twin-PDs are detected to thereby calculate received light power. An expression of the calculation is given as follows.

$$(IX\_Re^2 + IX\_Im^2) + (IY\_Re^2 + IY\_Im^2)$$

After received light power is detected, AMP gain control is performed in the same manner as in FIG. 4. That is, although FIG. 4 shows the case where digitized signals are used for performing control, here is shown the case where analog signal values of photocurrents are directly used for performing control. Although a method of monitoring the strength of the optical signal from four output signals (Ex_Re, Ex_Im, Ey_Re and Ey_Im) of the 90° hybrid circuit has been described as a configuration for performing AMP gain control, a method of splitting the optical signal in front of the 90° hybrid circuit and monitoring the strength of the optical signal by means of a light power monitor so that the monitored strength of the optical signal is used for AMP gain control may be used.

Figure 10:
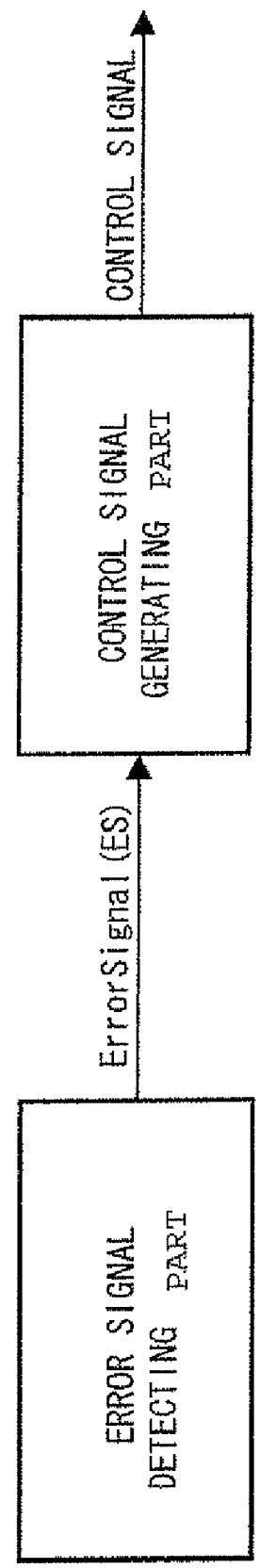
FIG. 10 is a view for detailed explanation of the 90° hybrid circuit and the gain control method for the AMPs.

FIG. 10 is a diagram for detailed explanation of a control method for the 90° hybrid circuit and AMP gain control.

An operation in the control signal generating circuit for the 90° hybrid circuit and the AMP gain control method will be described. Since both the 90° hybrid circuit and the AMP gain control are similar in processing in the control signal generating circuit, the processing method will be described while generalized as follows. Incidentally, the description of FIG. 10 does not include the case where AMP gain control is performed by use of an LUT.

FIG. 10 is a simple block diagram for generalization. A control signal generating circuit receives an error signal detected by an error signal detecting part provided as a prior stage and generates a control signal. For example, in control of the 90° hybrid circuit, the error signal detecting part is a block which calculates a correlation signal. For example, in AMP control, the error signal detecting part is a block which calculates input signal light power. The control signal generating circuit generates a control signal in accordance with the expression of Kp*ErrorSignal. This expression is a basic control method called P (Proportional) control, and Kp is called proportional gain and decided by characteristic of a subject of control (90° phase or AMP gain), required response speed, etc. Further, PI (Proportional Integral) control which is a combination of P control and I (Integral) control using an integrated value of error signal or PID (Proportional Integral Differential) control which is a combination of P control, I control and D (Differential) control using a differentiated value of error signal can be used in the control signal generating circuit to thereby improve control accuracy and control speed.

Figure 11:
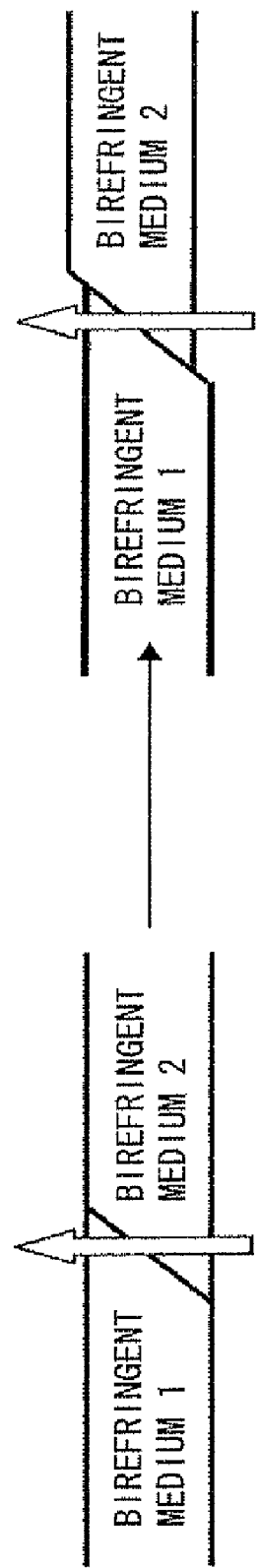
FIG. 11 is a view for explaining a control method for a quarterwave plate.

FIG. 11 is a view for explaining a method for controlling a quarter-wave plate.

A quarter-wave plate can be realized in such a manner that light is made incident on a birefringent medium adjusted to form a phase difference of $\pi/2$ between a horizontal direction and a vertical direction so that a deviation axis is inclined at an angle of 45° with respect to an optical axis. When the quarter-wave plate is used in the 90° hybrid circuit, it is necessary to adjust the optical axis of incident light (local oscillated light) in the case where the optical axis must be adjusted, and it is necessary to adjust the phase difference of the birefringent medium in the case where the phase difference of the birefringent medium is shifted from $\pi/2$ because of a temperature variation, etc.

As an example of the method for adjusting the optical axis, there is a method of mechanically rotating the wave plate by using a stepping motor or a method of adjusting the optical axis of incident light based on a magnetic field by using a Faraday rotator.

As an example of the method for adjusting the phase difference of the birefringent medium, there is a method in which two birefringent media as shown in FIG. 11 are prepared and the positions of the two birefringent media are controlled by a stepping motor to thereby adjust the total thickness of the birefringent media.

Although the aforementioned embodiment uses a 90° hybrid circuit using PBSs (polarization beam splitters), such a 90° hybrid circuit can be also realized by an MMI (multi-mode interface) coupler or four 3 dB couplers and a 90° phase delay part. These 90° hybrid circuits may be used in the aforementioned embodiment.

A 90° hybrid circuit using an MMI coupler can be realized by a PLC (planar lightwave circuit) technique. In this case, the phases of the received signal and the local oscillated light can be controlled based on temperature control due to a Peltier element or a heater. A 90° hybrid circuit having four 3 dB couplers and a 90° phase delay part can be realized by an LN (LiNbO$_3$) technique. In this case, the phases of the received signal and the local oscillated light can be controlled by a voltage.

Figure 12:
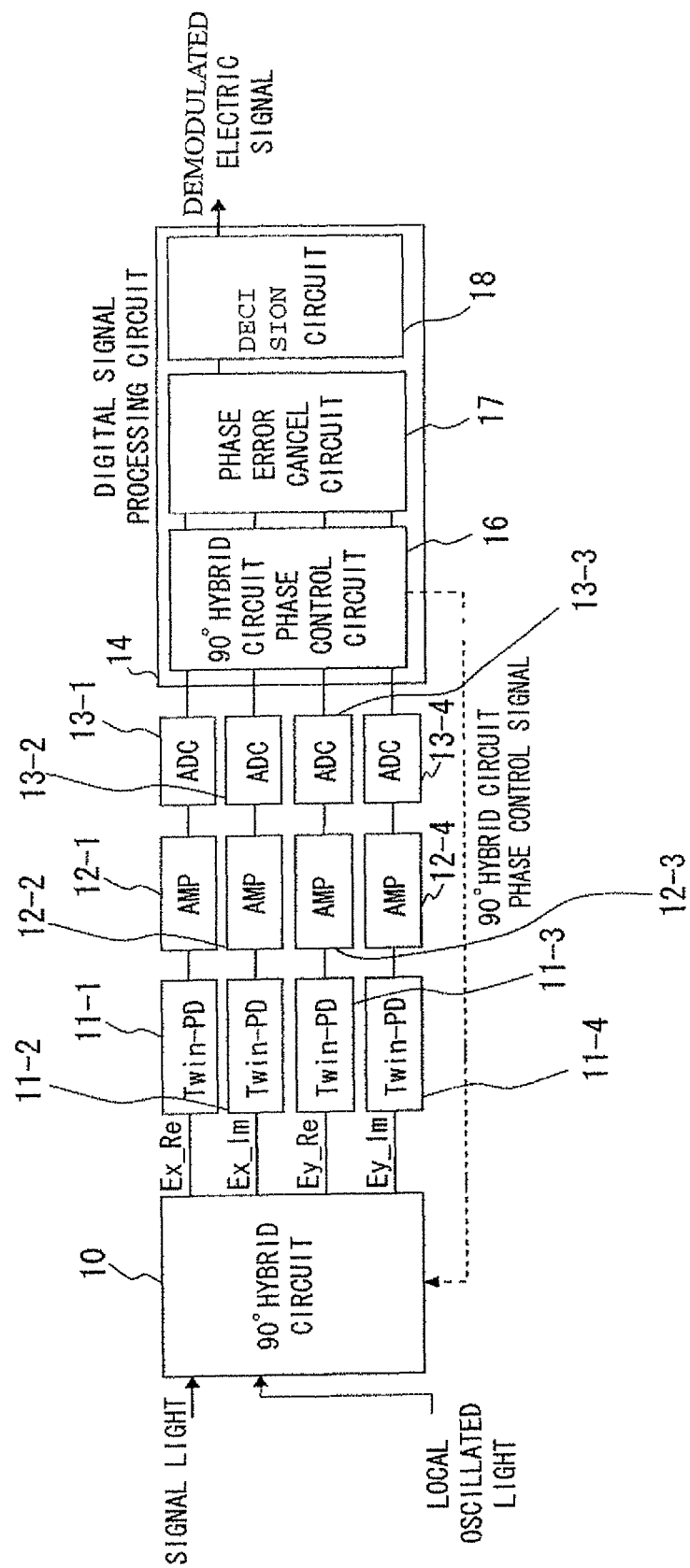
FIG. 12 is a diagram showing an example of overall configuration of the optical receiver in the case where phase error of the 90° hybrid circuit shown in FIGS. 3A and 3B or in FIGS. 9A and 9B is corrected.

FIG. 12 is a diagram showing an example of overall configuration of the optical receiver in the case where the phase error of the 90° hybrid circuit is corrected as shown in FIGS. 3A and 3B or in FIGS. 9A and 9B.

In FIG. 12, constituent parts the same as in FIG. 1 are referred to by the same reference numerals and description of the parts will be omitted.

In FIG. 12, a 90° hybrid circuit phase control circuit 16 is provided in the DSP circuit 14. Since the phase error correction method shown in FIGS. 3A and 3B is used, the 90° hybrid circuit phase control circuit 16 receives outputs of four ADCs 13-1 to 13-4 as inputs, generates a phase control signal and supplies the phase control signal to the 90° hybrid circuit 10. As is obvious from this configuration diagram, feedback control is performed herein.

Figure 13:
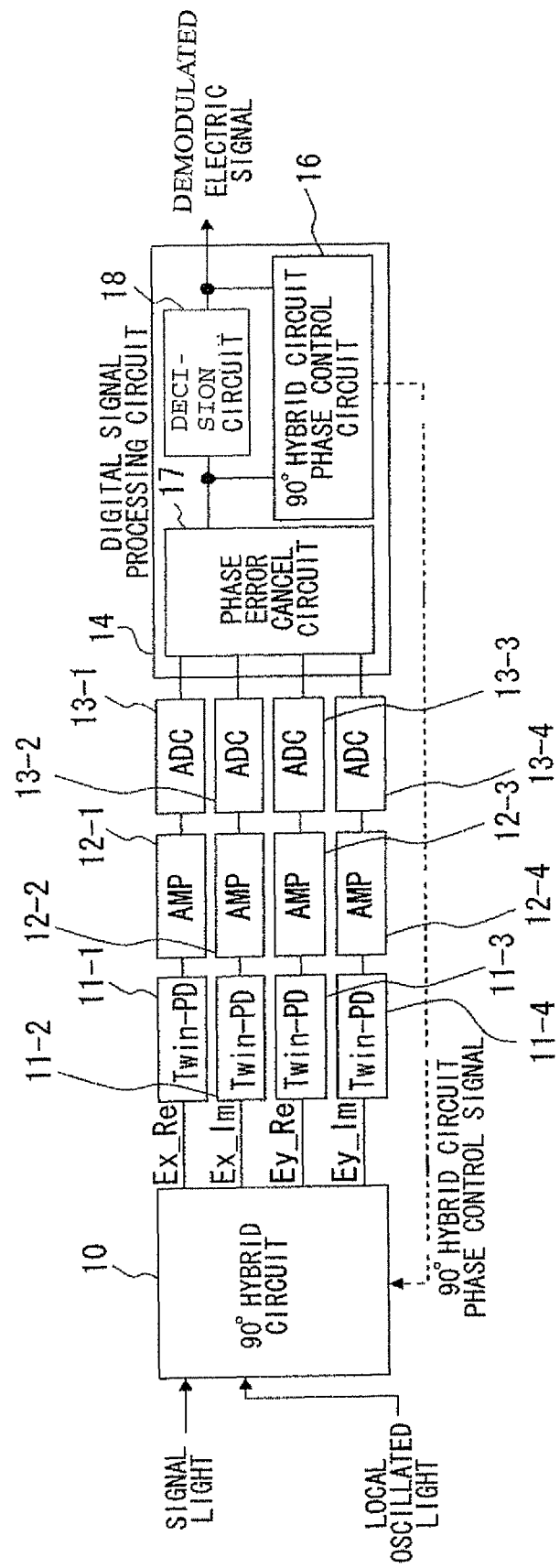
FIG. 13 is a diagram showing an example of overall configuration of the optical receiver in the case where phase error of the 90° hybrid circuit shown in FIGS. 7A and 7B is corrected.

FIG. 13 is a diagram showing an example of overall configuration of the optical receiver in the case where the phase error of the 90° hybrid circuit is corrected as shown in FIGS. 7A and 7B.

In FIG. 13, constituent parts the same as in FIG. 1 are referred to by the same reference numerals and description of the parts will be omitted.

In FIG. 13, a 90° hybrid circuit phase control circuit 16 receives input and output signals of a discrimination circuit 18 and generates a phase control signal by computing a phase difference between the input and output signals of the discrimination circuit 18. Also in this case, configuration is made so that feedback control is performed.

Figure 14:
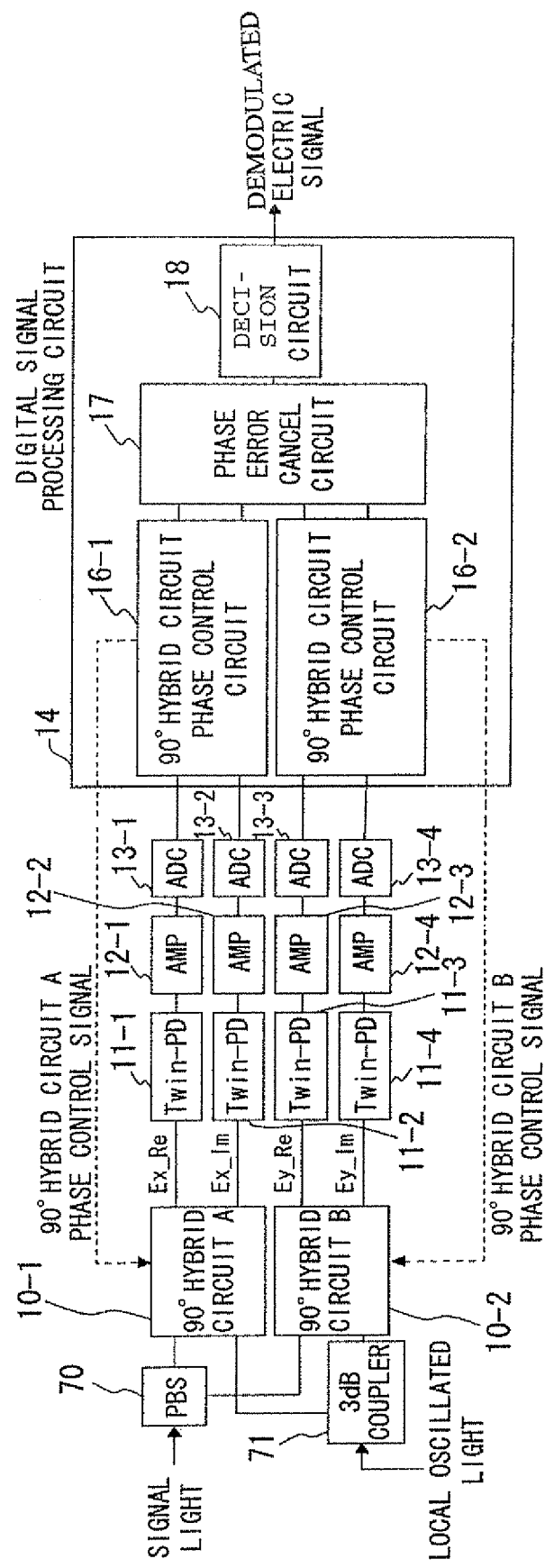
FIG. 14 is a diagram showing another example of overall configuration of the optical receiver in the case where phase error of the 90° hybrid circuit shown in FIGS. 3A and 3B or in FIGS. 9A and 9B is corrected.

FIG. 14 is a diagram showing another example of overall configuration of the optical receiver in the case where the phase error of the 90° hybrid circuit is corrected as shown in FIGS. 3A and 3B or in FIGS. 9A band 9B.

In FIG. 14, constituent parts the same as in FIG. 1 are referred to by the same reference numerals and description of the parts will be omitted.

FIG. 14 shows an example of configuration in the case where a 90° hybrid circuit has no polarization beam splitter. Signal light is split into orthogonal polarized waves by a polarization beam splitter 70 which is provided separately. The polarized waves of the signal light are inputted to 90° hybrid circuits 10-1 and 10-2 respectively. Local oscillated light is split into two by a 3 dB coupler 71. The split parts of local oscillated light are inputted to the 90° hybrid circuits 10-1 and 10-2 respectively. Signals of real part and imaginary part of x polarized wave obtained by the 90° hybrid circuit 10-1 are converted into electric signals by Twin-PDs 11-1 and 11-2 respectively. The electric signals are amplified by AMPs 12-1 and 12-2 and converted into digital signals by ADCs 13-1 and 13-2, respectively. The digital signals are inputted to a 90° hybrid circuit phase control circuit 16-1. The 90° hybrid circuit phase control circuit 16-1 generates a phase control signal by the method shown in FIGS. 3A and 3B or in FIGS. 9A and 9B and supplies the phase control signal to the 90° hybrid circuit 10-1. Similarly, signals of real part and imaginary part of y polarized wave obtained by the 90° hybrid circuit 10-2 are converted into electric signals by Twin-PDs 11-3 and 11-4 respectively. The electric signals are amplified by AMPs 12-3 and 12-4 and converted into digital signals by ADCs 13-3 and 13-4, respectively. The digital signals are inputted to a 90° hybrid circuit phase control circuit 16-2. The 90° hybrid circuit phase control circuit 16-2 generates a phase control signal by the method shown in FIGS. 3A and 3B or in FIGS. 9A and 9B and supplies the phase control signal to the 90° hybrid circuit 10-2. Also in this case, feedback control is performed.

Figure 15:
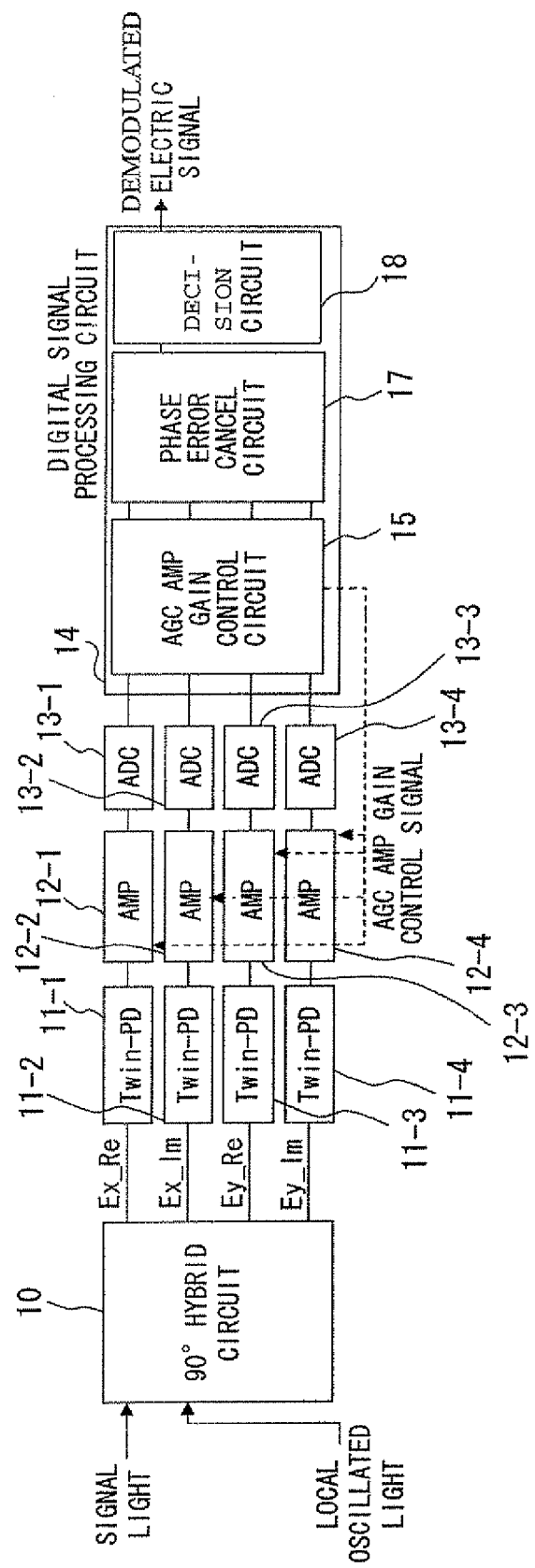
FIG. 15 is a diagram showing an example of overall configuration of the optical receiver in the case where the gain control of the AMPs as shown in FIG. 5 is performed.

FIG. 15 is a diagram showing an example of overall configuration of the optical receiver in the case where AMP gain control is performed as shown in FIG. 5.

In FIG. 15, constituent parts the same as in FIG. 1 are referred to by the same reference numerals and description of the parts will be omitted.

An AMP gain control circuit 15 is provided in the DSP circuit 14 and performs AMP gain control by using outputs of the ADCs 13-1 to 13-4 described above with reference to FIG. 5. That is, light intensity is calculated from optical signals converted into digital signals so that gains of AMPs are controlled on the basis of the light intensity. Control serves as feedback control.

Figure 16:
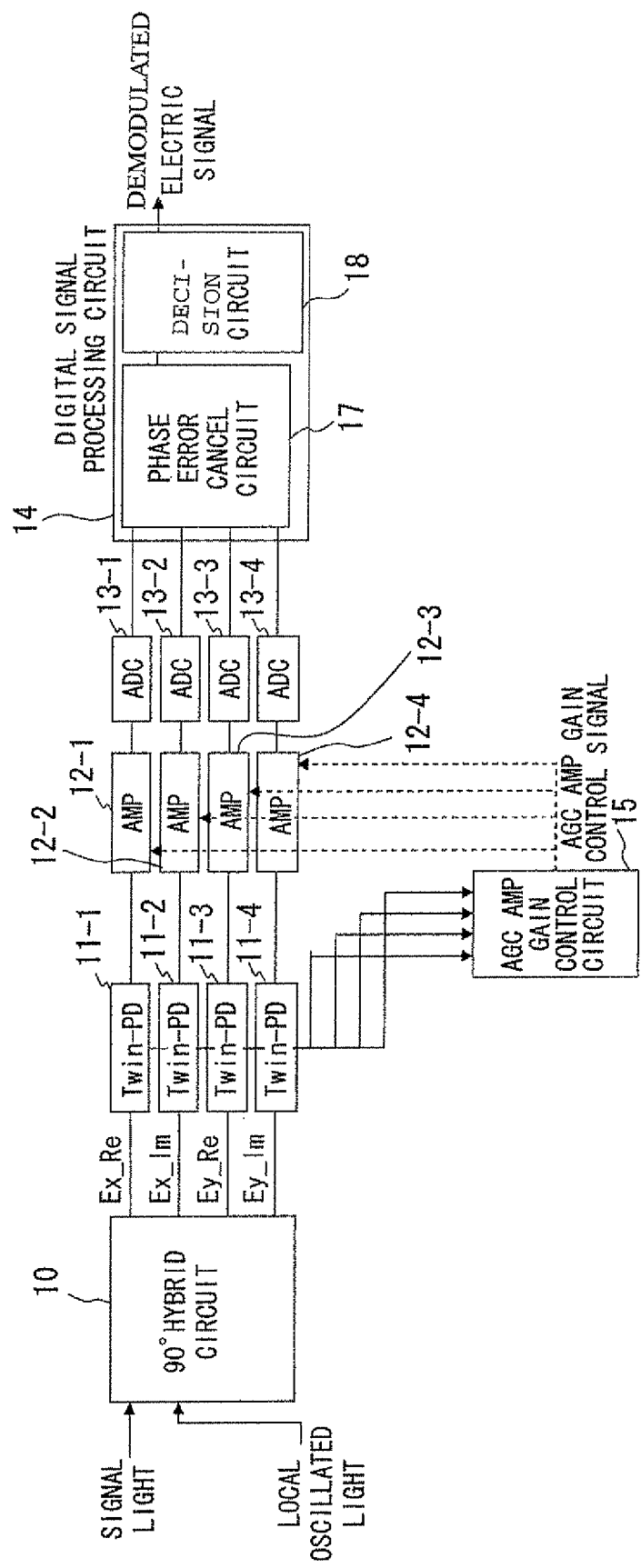
FIG. 16 is a diagram showing an example of overall configuration of the optical receiver in the case where analog values of an optical signal are detected and the gains of the AMPs are controlled.

FIG. 16 is a diagram showing an example of overall configuration of the optical receiver in the case where analog values of optical signals are detected to thereby perform AMP gain control.

In FIG. 16, constituent parts the same as in FIG. 1 are referred to by the same reference numerals and description of the parts will be omitted.

In FIG. 16, an AMP gain control circuit 15 detects not signals digitized by a stage posterior to ADCs 13-1 to 13-4 but photocurrents directly from Twin-PDs 11-1 to 11-4 to thereby obtain light intensity. Then, gains of AMPs 12-1 to 12-4 are controlled on the basis of the light intensity so that strengths of signals outputted from the AMPs 12-1 to 12-4 are made equal to target strength values. In this case, an LUT may be used for controlling the AMPs 12-1 to 12-4. Although FIG. 16 shows the case where the AMP gain control circuit 15 is provided outside of the DSP circuit 14, the AMP gain control circuit 15 per se may be incorporated in the DSP circuit 14 in such a manner that ADCs (analog-to-digital converters) are provided in the DSP circuit 14 and the AMP gain control circuit 15 is provided as a stage posterior to the ADCs.

Figure 17:
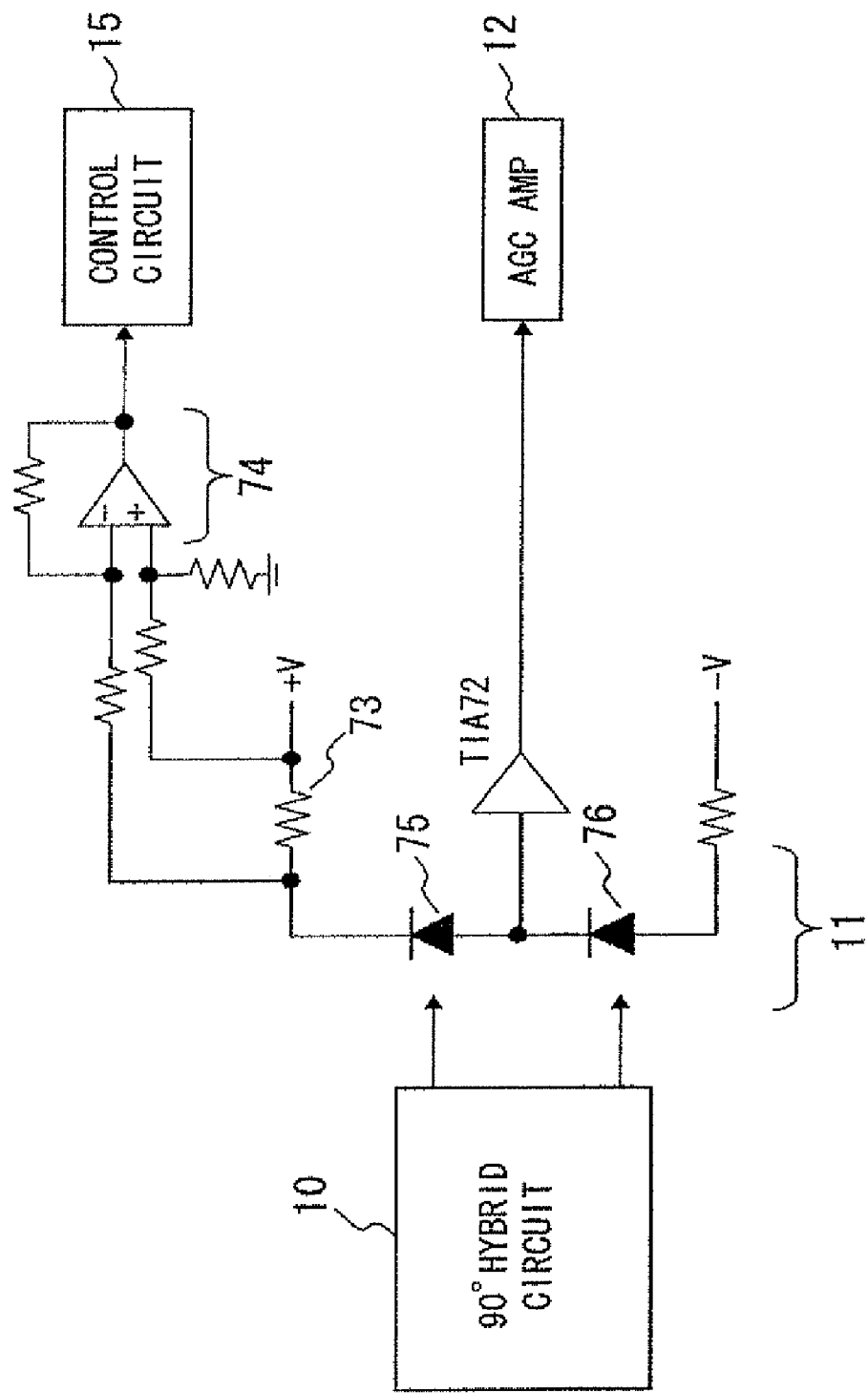
FIG. 17 is a diagram showing an example of a circuit for detecting a photocurrent of a Twin-PD.

FIG. 17 is a diagram showing an example of a circuit for detecting a photocurrent of a Twin-PD.

An optical signal outputted from the 90° hybrid circuit 10 is converted into an electric signal by a Twin-PD 11 which is composed of PDs 75 and 76. Whether the voltage appearing as an input of a TIA (TransImpedance Amplifier) 72 is plus or minus is decided by which of the PDs 75 and 76 is turned on. This electric signal is amplified by the TIA 72 and supplied to an AMP 12. A photocurrent which flows in the Twin-PD 11 appears as a voltage in a part of a resistor 73. This voltage is amplified by an amplifier 74 and inputted to an AMP gain control circuit 15.

Figure 18:
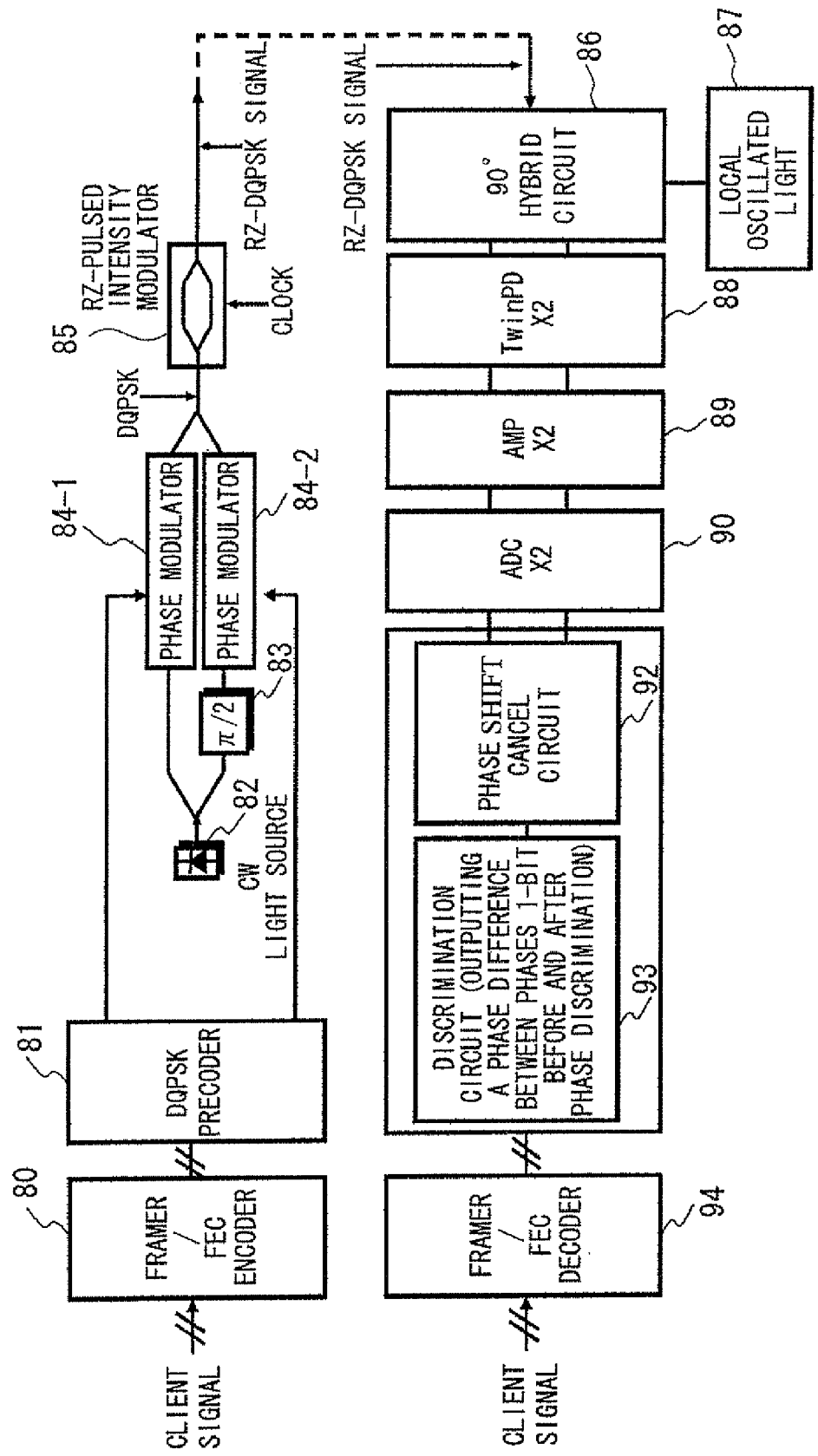
FIG. 18 is a diagram for explanation concerned with a modulator-demodulator according to the embodiment.

FIG. 18 is a diagram for explanation about a modulator-demodulator according to the embodiment.

In FIG. 18, a proposal for a modulation-demodulation mode used in a system is made on the basis of a principle of operation of a phase error cancel circuit.

In FIG. 18, a client signal is encoded by a framer/FEC encoder 80 on a transmission side and converted into electric signals coded to DQPSK signals by a DQPSK precoder 81. The electric signals are applied to electrodes of phase modulators 84-1 and 84-2. Light emitted from a light source 82 is made to branch into two. One is delayed by a π/2 delay unit 83. The two are modulated by phase modulators 84-1 and 84-2 respectively. A DQPSK signal from the phase modulators 84-1 and 84-2 is modulated to an RZ pulse signal by an RZ-pulsed intensity modulator 85. The RZ pulse signal is transmitted as an RZ-DQPSK signal from the RZ-pulsed intensity modulator 85. The transmitted RZ-DQPSK signal is mixed with local oscillator light 87 in a 90° hybrid circuit 86 so as to be received as coherent light. The coherent-received optical signals are converted into electric signals by Twin-PDs 88. The electric signals are amplified by AMPs 89 and converted into digital signals by ADCs 90. The digital signals are inputted to a DSP 91. In the DSP 91, a phase error cancel circuit 92 performs an arithmetic operation for canceling phase error and a decision circuit 93 outputs a phase difference between a signal after phase discrimination and a signal 1-bit ago. The proposed method which will be described below has a feature in that a phase difference between a signal after phase discrimination and a signal 1-bit ago is computed in the decision circuit 93 provided as a stage posterior to the phase error cancel circuit 92. The discriminated signal is decoded by a framer/FEC decoder 94 and processed as a client signal.

A Δω compensating method (feed-forward control) in the phase error cancel circuit is based on an arithmetic operation represented by the following expression.

$Es = \exp(j(\Delta\omega t + q(t)))$ $\Delta\omega t = (\arg((Es)^4) - p)/4$ $\{Es\}^4 = \exp(j(4\Delta\omega t + 4q(t)))$
$q(t) = \pi/4, 3\pi/4, 5\pi/4, 7\pi/4, 4q(t) = (2N-1)\pi$
Δωt is calculated from an average value of several bits.

$q(t) = \arg(Es) - \Delta\omega t$

When Δωt is not smaller than π/4, it is however necessary to exercise ingenuity because there is a possibility that the phase after discrimination may be mistaken for another symbol.

For example, in the case of a transmission symbol of 45°, $\Delta\omega t = 42°\, q(t) = 87 - (348(348) - 180)/4 = 45, \Delta\omega t = 42$ $\Delta\omega t = 48°\, q(t) = 93 - (12(372) - 180)/4 = 135, \Delta\omega t = -42$ For example, in the case of a transmission symbol of 135°, $\Delta\omega t = 42°\, q(t) = 177 - (348(708) - 180)/4 = 135, \Delta\omega t = 42$ $\Delta\omega t = 48°\, q(t) = 183 - (12(732) - 180)/4 = 225, \Delta\omega t = -42$ The aforementioned symbol shift is insignificant in the case of DQPSK demodulation in which a phase difference between a signal after discrimination and a signal 1-bit ago is outputted from the discrimination circuit.

When, for example, symbols of 45° and 135° are transmitted successively, the phase difference is 90° in both cases of Δωt=42° and 48°, judging from the aforementioned example.

Accordingly, to prevent the phase error cancel circuit from making the aforementioned mistake, configuration may be made so that a signal is transmitted in a DQPSK modulation mode on a transmission side whereas a phase difference between a current symbol and a previous symbol is outputted in processing in the phase error cancel circuit on a reception side. In this case, the following prerequisites are required.
(1) Δω is sufficiently small compared with the bit rate.
(2) DQPSK preceding is performed on a transmission side.

When the aforementioned configuration is used, reduction in the circuit scale can be expected because the circuit for compensating the 90° symbol shift is not required, and the advantage of easy upgrading of the DSP circuit can be obtained because the input-output interface for the DQSPK modulation mode of direct detection is compatible. Although an embodiment of the DQSPK modulation mode has been described above, the invention can be applied to other differential coded signals such as a DPSK modulation mode and a DMPSK modulation mode. In this case, a precoder corresponding to each modulation mode is required.

As described above, in feedback control in the aforementioned embodiment, control accuracy is decided by accuracy in detection of a control signal near a target value because controlling is performed so that a value inputted to the control circuit converges at the target value. On the contrary, in feed-forward control in Patent Document 1, accuracy in detection of a control signal must be high not only when the control signal is near to a target value but also when the control signal is far from the target value because the detected control signal is used directly. In an optical communication system kept in mind in the aforementioned embodiment, there is however a possibility that quantization error in each ADC may become large because a high-speed signal close to a limit of an electric circuit must be handled so that the number of quantization bits in each ADC is limited.

Accordingly, the configuration using feedback control proposed in the aforementioned embodiment can expect great improvement of characteristic compared with the configuration using feed-forward control in Patent Document 1.

Figure 20:
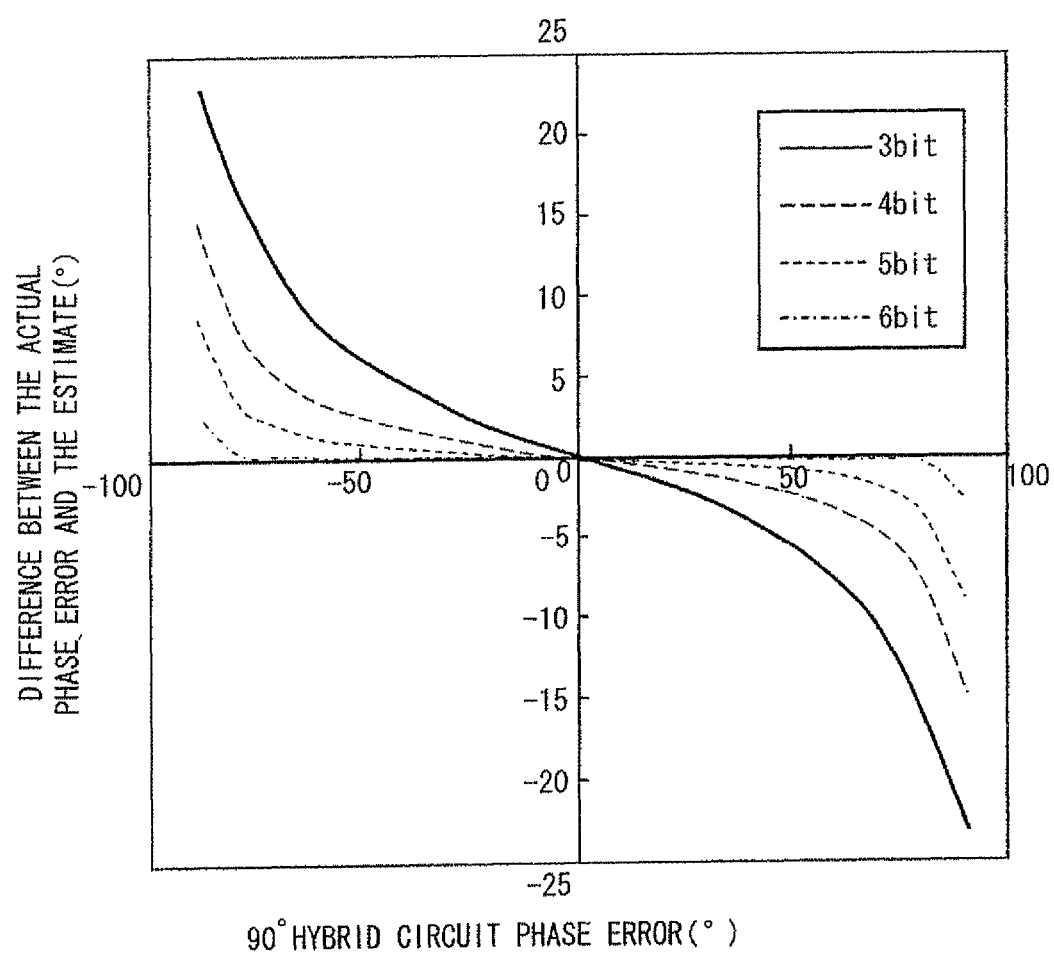
FIG. 20 is a graph showing the phase error of a 90° hybrid circuit and the difference between the actual phase error and the estimate.

The aforementioned graph of FIG. 20 is a graph showing control error in the case where feedforward control is used in consideration of quantization error of each ADC. As is obvious from the graph, it is found that control error becomes large in the case where the phase of the 90° hybrid circuit is shifted largely when the number of quantization bits is limited. In this embodiment, the case where control error becomes large can be eliminated so that the phase error of the 90° hybrid circuit and the gain of each AMP can be controlled with high accuracy at high speed.

Incidentally, in the aforementioned embodiment, the three methods of controlling the phase of the 90 hybrid circuit and the two methods of controlling the gain of each AMP can be reciprocally implemented in any combination.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical receiver comprising:
   an optical mixer that mixes a received optical signal and a local oscillator light in at least two phases and thereby extracts a real part and an imaginary part of each of orthogonal polarized wave components corresponding to each optical phase;
   a photo-detector that converts the real part and the imaginary part of each of orthogonal polarized wave components corresponding to each optical phase into electric analog signals;
   an analog-to-digital convertor that converts the electric analog signals obtained by the photo-detector into digital signals; and
   a circuit that multiplies the real part and the imaginary part of each of the orthogonal polarized wave components, adds multiplication results of each of the orthogonal polarized wave components, averages results of the addition, and generates a signal for corresponding phase of one of the real part and the imaginary part of each of the orthogonal polarized wave components to the optical mixer to control the optical mixer so that a result of the averaging becomes to zero or close to zero.

2. An optical receiver according to claim 1, wherein the circuit is provided individually in accordance with each of the orthogonal polarized wave components.

3. An optical receiver according to claim 1, wherein the circuit calculates a correlation value between the digital signals and controls the phase between the real part and the imaginary part of each of the orthogonal polarized wave components corresponding to each optical phase so that the correlation value becomes zero or close to zero.

4. An optical receiver according to claim 1, wherein the circuit discriminates between the digital signals, detects a phase difference between each digital signal before discrimination and each digital signal after discrimination and controls the phase shift of the at least two optical signals based on a control signal corresponding to the magnitude of a variation of the phase difference.

5. An optical receiver according to claim 4, wherein dithering is applied to the control signal, so that whether the phase shift of the real part and the imaginary part of each of the orthogonal polarized wave components corresponding to each optical phase has a plus direction or a minus direction is detected based on a sign of the phase difference.

6. An optical receiver according to claim 5, wherein the circuit:
   calculates a phase difference between a signal before discrimination and a signal after discrimination;
   squares a result of the calculation;
   eliminates signal vibration caused by dithering;
   generates a phase shift control signal between the real part and the imaginary part of each of the orthogonal polarized wave components corresponding to each optical phase based on a signal after the dithering elimination; and
   applies dithering to the phase control signal.

7. An optical receiver according to claim 1, wherein the circuit obtains strength of the optical signal from the digital signals and uses a control signal corresponding to magnitude of a variation of the strength for controlling a phase shift between the real part and the imaginary part of each of the orthogonal polarized wave components corresponding to each optical phase.

8. An optical receiver according to claim 7, wherein dithering is applied to the control signal, so that whether the phase shift in the optical mixer has a plus direction or a minus direction is detected based on a sign of the variation of the strength of the optical signal.

9. An optical receiver according to claim 8, wherein the circuit:
   calculates squares of real part and imaginary part of each of the orthogonal polarized wave components corresponding to each optical phase extracted by the optical mixer;
   adds the square of the real part and the square of the imaginary part;
   removes a DC component from a result of the addition;
   eliminates signal vibration caused by dithering from an output of the DC component removal part;
   generates a phase control signal for controlling a phase shift between the real part and the imaginary part of each of the orthogonal polarized wave components corresponding to each optical phase from a signal after elimination of dithering; and
   applies dithering to the phase control signal.

10. An optical receiver, comprising:
    an optical mixer that mixes a received optical signal and a local oscillator light in at least two phases and thereby extracts at least two optical signals corresponding to each phase;
    a photo-detector that converts the at least two optical signals corresponding to each optical phase into at least two electric signals;
    an amplifier that amplifies the at least two electric analog signals obtained by the photo-detector, with set gains;

an analog-to-digital convertor that converts the electric analog signals obtained by the photo-detector into at least two digital signals; and
a circuit that calculates strength of the optical signal from the digital signals and optimally controls the gains of the amplifier via feedback control to the amplifier in accordance with the strength, wherein
the optical mixer extracts each of orthogonal polarized waves of the at least two optical signals, and
the circuit
squares a real part and an imaginary part of each of polarized wave components of the at least two optical signals based on each of the signals extracted by the optical mixer,
adds the square of the real part and the square of the imaginary part of each polarized wave, and
generates a gain control signal for controlling each gain of the amplifier, from a result of the addition.

11. An optical receiver according to claim 10, wherein the circuit gives a gain control signal to the amplifier so that the result of the addition becomes close to a target value.

12. An optical receiver according to claim 10, wherein:
the circuit has a table in which each gain of the amplifier is stored in association with magnitude of the gain control signal; and
the circuit sets the magnitude of the gain control signal for obtaining a predetermined gain based on the result of the addition by referring to the table.

13. An optical receiver according to claim 10, wherein the circuit calculates strength of the at least two optical signals from a current value generated in the photo-detector.

14. An optical receiver according to claim 13, wherein:
the photo-detector is a photodiode; and
the current value is magnitude of a photocurrent.

15. An optical receiver according to claim 10, wherein the amplifier includes a plurality of amplifiers which amplify the at least two optical signals, respectively.

16. An optical receiver for receiving an optical signal coded by a differential coding mode as coherent light and extracting data from the optical signal by digital processing, comprising:
an optical mixer that mixes the received optical signal and a local oscillator light in at least two phases and extracts at least two signals corresponding to each phase;
a photo-detector that converts the at least two signals corresponding to each phase into at least two electric signals;
an amplifier that amplifies the at least two electric signals obtained by the photo-detector, with set gains;
an analog-to-digital convertor that converts the at least two electric signals amplified by the amplifier into at least two digital signals;
a circuit that cancels phase error of the at least two digital signals, discriminates the at least two digital signals having canceled phase error, and outputs a difference between a currently discriminated signal and a previous signal discriminated one bit ago as a result of discrimination.

17. An optical receiver according to claim 16, wherein the differential coding mode is a DQPSK mode.

18. An optical receiver comprising:
an optical mixer that mixes a received optical signal and a local oscillator light in at least two phases and extracts at least two signals corresponding to each phase;
a photo-detector that converts the at least two signals corresponding to each optical phase into at least two electric signals;
an amplifier that amplifies the at least two electric signals obtained by the photo-detector with set gains;
an analog-to-digital convertor that converts the at least two electric signals obtained by the photo-detector into at least two digital signals;
a first circuit that calculates a phase shift between the received optical signal and the local oscillator light used in the optical mixer based on the at least two digital signals obtained by the analog-to-digital convertor, and at least one inter-system phase shift correction signal to the optical mixer to control each inter-system phase of the optical mixer so as to eliminate the inter-system phase shift when there is some inter-system phase shift; and
a second circuit that calculates strength of the optical signal from the digital signals and optimally controls gains of the amplifier via feedback control to the amplifier in accordance with the calculated strength,
wherein
the optical mixer extracts each of orthogonal polarized waves of the at least two signals, and
the second circuit
squares a real part and an imaginary part of each of polarized wave components of the at least two signals based on each of the signals extracted by the optical mixer,
adds the square of the real part and the square of the imaginary part of each polarized wave, and
generates a gain control signal to thereby control gains of the amplifier, from a result of the addition.

\* \* \* \* \*